(12) United States Patent
Venugopal et al.

(10) Patent No.: US 12,261,799 B2
(45) Date of Patent: Mar. 25, 2025

(54) SINGLE FREQUENCY NETWORK TRANSMISSION CONFIGURATION INDICATOR (TCI) STATE ACTIVATION

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 17/569,305

(22) Filed: Jan. 5, 2022

(65) Prior Publication Data
US 2023/0216644 A1 Jul. 6, 2023

(51) Int. Cl.
*H04L 5/00* (2006.01)
*H04W 72/20* (2023.01)

(52) U.S. Cl.
CPC .......... *H04L 5/0053* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2021/0385832 A1* | 12/2021 | Zhang | ................. | H04B 7/0695 |
| 2022/0116256 A1* | 4/2022 | Shahmohammadian | ................... | H04L 27/2675 |
| 2023/0007504 A1* | 1/2023 | Jang | ..................... | H04B 7/0695 |
| 2023/0131134 A1* | 1/2023 | Mei | ....................... | H04L 5/0023 370/329 |
| 2023/0064231 A1* | 3/2023 | Haghighat | ............ | H04W 72/23 |
| 2023/0198723 A1* | 6/2023 | Sun | ........................ | H04B 7/088 370/329 |
| 2023/0413281 A1* | 12/2023 | Park | ...................... | H04W 72/11 |
| 2024/0089984 A1* | 3/2024 | Li | ...................... | H04B 7/06952 |

FOREIGN PATENT DOCUMENTS

| | | | |
|---|---|---|---|
| KR | 10-2021-0075579 | * | 6/2021 |
| WO | 2021076589 A1 | | 4/2021 |
| WO | 2022236461 A1 | | 11/2022 |

OTHER PUBLICATIONS

Author Unknown, Discussion on Multi-TRP HST enhancements, pp. 1-8, Doc. No. R1-2110952, Nov. 11, 2021.*

(Continued)

*Primary Examiner* — Christopher M Crutchfield
(74) *Attorney, Agent, or Firm* — Loza & Loza, LLP

(57) ABSTRACT

Aspects relate to techniques for activating transmission configuration indicator (TCI) states based on a TCI state update list including a plurality of component carriers. A TCI state activation message for a physical downlink control channel (PDCCH) can include two TCI states for single frequency network (SFN) operation of a control resource set (CORESET) associated with a serving cell ID. A user equipment (UE) may receive the TCI state activation message and activate at least one of the two TCI states for each component carrier in the TCI state update list in response to the TCI state update list including the serving cell ID and based on a respective SFN configuration of each of the component carriers.

18 Claims, 21 Drawing Sheets

(56) References Cited

OTHER PUBLICATIONS

Author Unknown, On Enhancements for HST-SFN deployment, pp. 1-3, Doc. No. R1-2112028, Nov. 11, 2021.*
Author Unknown, Enhancements to HST-SFN deployments, Doc. No. R1-2111480, pp. 1-4, Nov. 11, 2021.*
Author Unknown, Remaining issues on HST-SFN schemes, pp. 1-13, Nov. 19, 2021.*
International Search Report and Written Opinion—PCT/US2022/050599—ISA/EPO—Mar. 28, 2023.
Moderator (Intel Corporation): "Summary#2 of AI: 8.1.2.4 Enhancements on HST-SFN Deployment", 3GPP TSG RAN WG1 #107-e, R1-2112660, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, 91 Pages, Nov. 20, 2021 (Nov. 20, 2021), XP052097924, the whole document.

* cited by examiner

SINGLE FREQUENCY NETWORK TRANSMISSION CONFIGURATION INDICATOR (TCI) STATE ACTIVATION

TECHNICAL FIELD

The technology discussed below relates generally to wireless communication networks, and more particularly, to transmission configuration indicator (TCI) state indication in single frequency networks (SFNs).

INTRODUCTION

High-speed trains (HSTs) may utilize single frequency networks (SFNs) to facilitate wireless communication. A user equipment (UE) located within a HST moves in a predefined path or trajectory (e.g., where the path/trajectory follows a train track) and at velocities exceeding 300 kilometers per hour. Remote radio heads or transmission and reception points (TRPs) may be deployed along the predefined path and associated with a base station. In SFNS, multiple TRPs may serve a single UE and transmit on the same time-frequency resource. Because of densification, SFN may be used to provide spatial diversity gain, where adjacent TRPs transmit the same data in a same time-frequency resource to provide the UE with a signal (carrying the data) from multiple TRPs simultaneously.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication is provided. The UE includes a transceiver, a memory, and a processor coupled to the transceiver and the memory. The processor and the memory can be configured to receive a transmission configuration indicator (TCI) state update list including a plurality of component carriers via the transceiver, receive a TCI state activation message including a first TCI state, a second TCI state, a serving cell identifier (ID), and a control resource set (CORESET) ID via the transceiver, and activate at least one of the first TCI state or the second TCI state for the CORESET ID associated with each of the plurality of component carriers in response to the serving cell ID being within the TCI state update list and based on a respective single frequency network (SFN) configuration of each of the plurality of component carriers.

Another example provides a method for wireless communication at a user equipment (UE). The method includes receiving a transmission configuration indicator (TCI) state update list including a plurality of component carriers, receiving a TCI state activation message including a first TCI state, a second TCI state, a serving cell identifier (ID), and a control resource set (CORESET) ID, and activating at least one of the first TCI state or the second TCI state for the CORESET ID associated with each of the plurality of component carriers in response to the serving cell ID being within the TCI state update list and based on a respective single frequency network (SFN) configuration of each of the plurality of component carriers.

Another example provides a base station configured for wireless communication. The base station includes a memory, and a processor coupled to the memory. The processor and the memory can be configured to transmit a transmission configuration indicator (TCI) state update list including a plurality of component carriers to a user equipment (UE) and transmit a TCI state activation message including a first TCI state, a second TCI state, a serving cell identifier (ID), and a control resource set (CORESET) ID. The TCI state activation message is configured to activate at least one of the first TCI state or the second TCI state on the UE for the CORESET ID associated with each of the plurality of component carriers based on the serving cell ID being within the TCI state update list and further based on a respective single frequency network (SFN) configuration of each of the plurality of component carriers.

Another example provides a method for wireless communication at a base station. The method includes transmitting a transmission configuration indicator (TCI) state update list including a plurality of component carriers to a user equipment (UE) and transmitting a TCI state activation message including a first TCI state, a second TCI state, a serving cell identifier (ID), and a control resource set (CORESET) ID. The TCI state activation message is configured to activate at least one of the first TCI state or the second TCI state on the UE for the CORESET ID associated with each of the plurality of component carriers based on the serving cell ID being within the TCI state update list and further based on a respective single frequency network (SFN) configuration of each of the plurality of component carriers.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
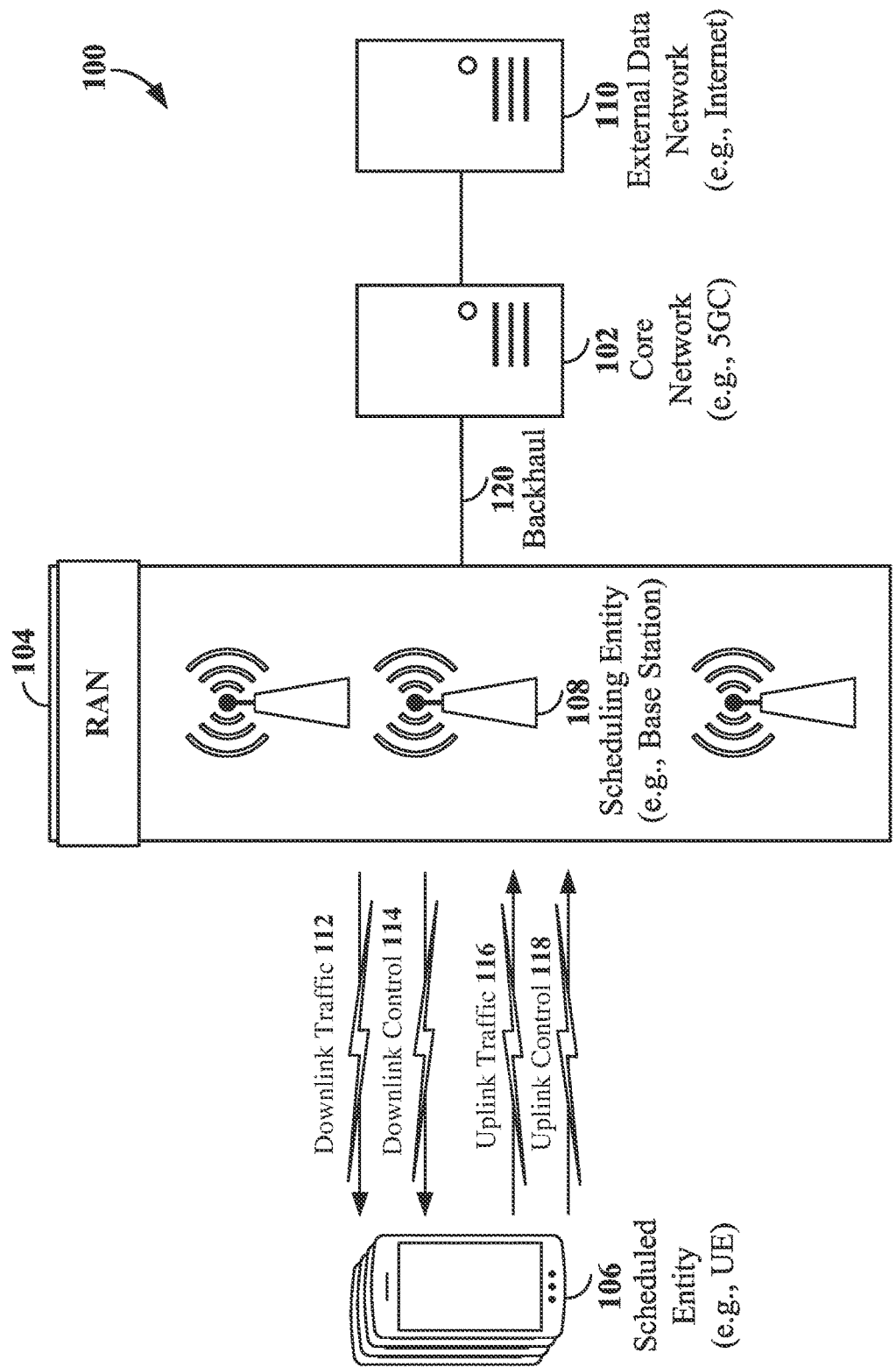
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implement across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

A base station (e.g., gNode B (gNB)) may transmit a transmission configuration indication (TCI) state configuration message (e.g., via a radio resource control (RRC) message) to a UE including a plurality of TCI states configured for the UE. Each TCI state may include quasi co-location (QCL) information indicating one or more downlink reference signals from which various radio channel properties of downlink transmissions may be inferred. An example of QCL information includes QCL-TypeD, which indicates a spatial property of a beam (e.g., a beam direction and/or beam width) associated with a particular downlink reference signal. From the QCL-TypeD information, the UE may infer the beam on which a downlink transmission may be communicated.

Once the configured TCI states are provided to the UE, a gNB may activate or deactivate one or more of the configured TCI states for the UE by transmitting a TCI state activation message, such as a medium access control (MAC) control element (MAC-CE). The base station may then select one of the activated TCI states to communicate a downlink transmission to the UE. For example, the base station may indicate a particular TCI state for a downlink transmission within downlink control information (DCI) scheduling the downlink channel or signal.

High-speed trains (HSTs) may utilize single frequency networks (SFN) to facilitate wireless communication. In SFNs, multiple transmission reception points (TRPs) of a base station, which may be deployed, for example, in a remote radio head (RRH) configuration, may serve a UE and transmit the same downlink transmission (e.g., downlink channel or downlink signal) to the UE on the same time-frequency resource. The base station may configure each TRP to utilize a different beam (e.g., different TCI state) associated with that TRP to transmit the downlink transmission to the UE.

In addition, the base station may transmit a single MAC-CE to activate two different TCI states (e.g., each associated with a different TRP) for a physical downlink control channel (PDCCH) control resource set (CORESET) that is configured (e.g., via RRC signaling) for SFN operation. For example, the UE may be configured (e.g., via RRC signaling) for SFN PDCCH reception per CORESET, per bandwidth part (BWP) that includes a plurality of CORESETs, or per component carrier that includes a plurality of BWPs. In examples in which the SFN PDCCH reception is configured per CORESET (e.g., the CORESET is configured as an SFN CORESET or a non-SFN CORESET), the SFN configuration (e.g., SFN or non-SFN) is applied to corresponding CORESETs across BWPs and component carriers. For example, the SFN configuration of CORESET 0 may be applied to CORESET 0 in each BWP in the same component carrier and other component carriers.

Each TRP may be associated with a single serving cell using a single component carrier for communication with the UE. In some examples, the serving cell (or component carrier) may be configured as part of a TCI state update list. The TCI state update list may include, for example, plurality of component carriers to which a TCI state activation message is applied. For example, if the serving cell identifier (ID) included in a PDCCH MAC-CE activating a single TCI state for a CORESET associated with the serving cell ID, the PDCCH MAC-CE is applied to all of the component carriers in the TCI state update list. For PDCCH MAC-CEs that activate two TCI states for a CORESET ID, it is currently undefined whether none, one, or both of the TCI states is applied to each of the component carriers in the TCI state update list. Moreover, it is further undefined whether each component carrier in the TCI state update list must support SFN operation in order to include two TCI states in a PDCCH MAC-CE, and if not, how the different TCI states are applied to each component carrier.

In various aspects, for PDCCH MAC-CEs activating two TCI states for SFN operation of a CORESET associated with a particular serving cell ID, the UE receiving the PDCCH MAC-CE may activate at least one of the two TCI states on the UE for each component carrier in the TCI state update list containing the particular serving cell ID. In some examples, the PDCCH MAC-CE may include a reserved field indicating activation of either the first TCI state or both the first and second TCI states for each of the plurality of component carriers in the TCI state update list.

In some examples, the UE may activate both TCI states for the CORESET ID associated with each of the component carriers. In this example, the SFN configuration of each of the component carriers may indicate that each of the component carriers supports the SFN operation for the CORESET ID. In some examples, the base station may be prohibited from including component carriers in the TCI state update list that do not support SFN operation for the CORESET ID. In some examples, the first TCI state included in the PDCCH MAC-CE may be associated with a TRP that serves as a Doppler anchor TRP for the UE. The Doppler anchor TRP applies beam-specific timing precompensation to downlink transmissions to the UE to reduce the delay spread between the transmissions from each of the TRPs.

In other examples, the UE may activate only one of the TCI states for each of the component carriers in the TCI state update list. For example, if the SFN configuration of each of the component carriers indicates that none of the component carriers supports SFN operation for the CORESET ID, the UE may activate only a single TCI state for each of the component carriers. In some examples, the UE may activate the first TCI state included in the PDCCH MAC-CE. In other examples, the reserved field in the PDCCH MAC-CE may indicate activation of the first TCI state or the second TCI state for each of the component carriers. In some examples, the UE may activate both TCI states for a first set of the plurality of component carriers in the TCI state update list that do support SFN operation for the CORESET ID, but may activate only a single TCI state for a second set of the plurality of component carriers in the TCI state update list that do not support SFN operation for the CORESET ID. In this example, the reserved field in the PDCCH MAC-CE may indicate whether the UE should activate the first TCI state or the second TCI state for the second set of the plurality of component carriers.

In some examples, the PDCCH MAC-CE may include three TCI states for the CORESET ID. One of the TCI states may be used for non-SFN operation, whereas the other two TCI states may be used for SFN operation of the CORESET ID. For example, the two SFN TCI states may be activated for all component carriers in the TCI state update list when the SFN configuration of the serving cell indicates that the serving cell supports SFN operation for the CORESET ID, while the single non-SFN TCI state may be activated for all component carriers in the TCI state update list when the SFN configuration of the serving cell indicates that the serving cell does not support SFN operation for the CORESET ID. As another example, the two SFN TCI states may be activated for a first set of the plurality of component carriers that support SFN operation for the CORESET ID, while the single non-SFN TCI state may be activated for a second set of the plurality of component carriers that do not support SFN operation for the CORESET ID.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, TX chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmissions. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control 114 information, including but not limited to scheduling information (e.g., a grant), synchronization or timing information, or other control information from another entity in the wireless communication network such as the scheduling entity 108. The scheduled entity (e.g., a UE 106) may transmit uplink control 118 information including one or more uplink control channels to the scheduling entity 108. Uplink control 118 information may include a variety of packet types and categories, including pilots, reference signals, and information configured to enable or assist in decoding uplink data transmissions.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
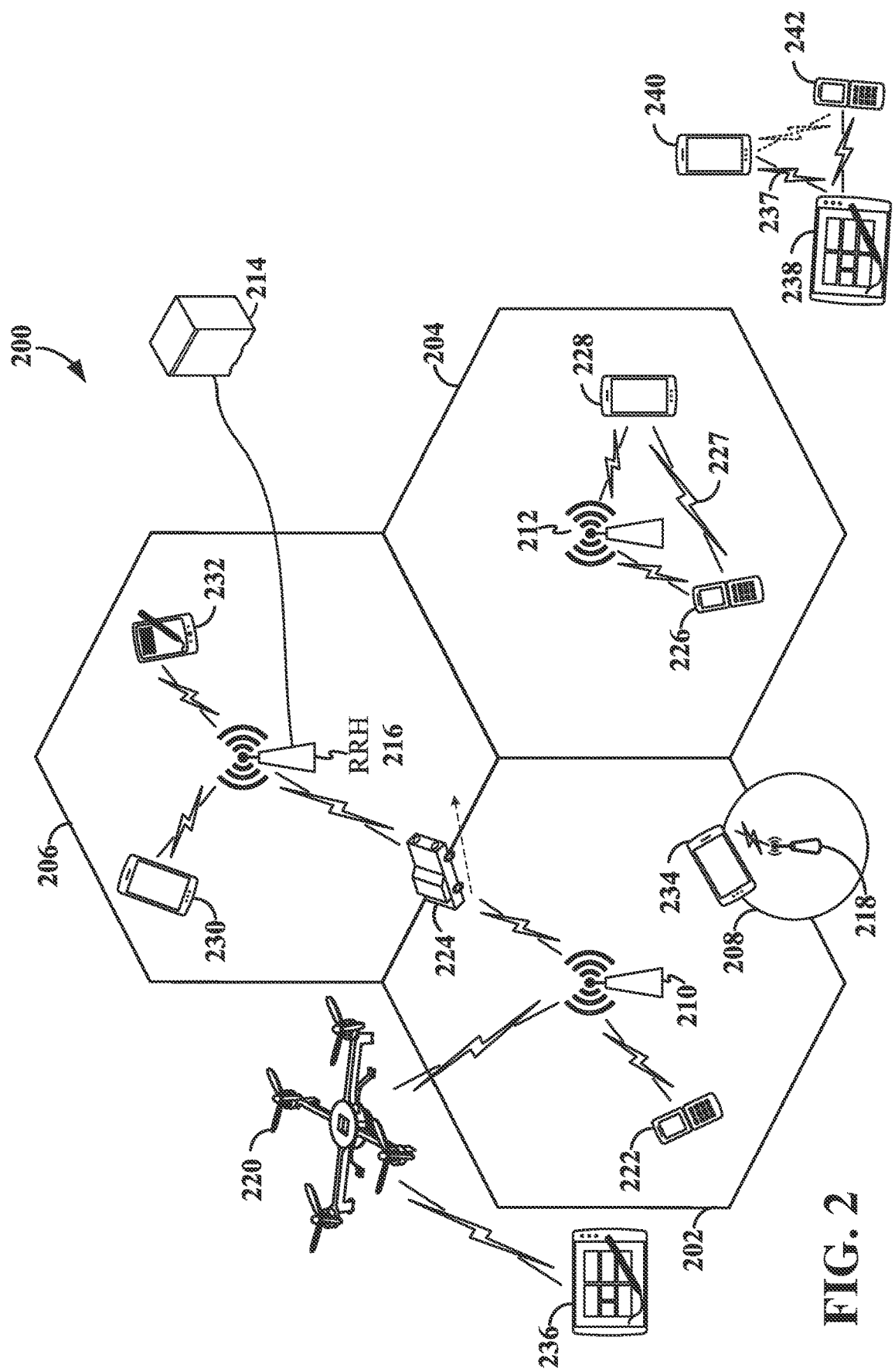
FIG. 2 is a diagram illustrating an example of a radio access network (RAN) according to some aspects.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206 and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214, is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an orthogonal frequency division multiplexing (OFDM) waveform, schematically illustrated in FIG. 3. It should be understood by those of ordinary skill in the art that the various aspects of the present disclosure may be applied to an SC-TDMA waveform in substantially the same way as described herein below. That is, while some examples of the present disclosure may focus on an OFDM link for clarity, it should be understood that the same principles may be applied as well to SC-FDMA waveforms.

Figure 3:
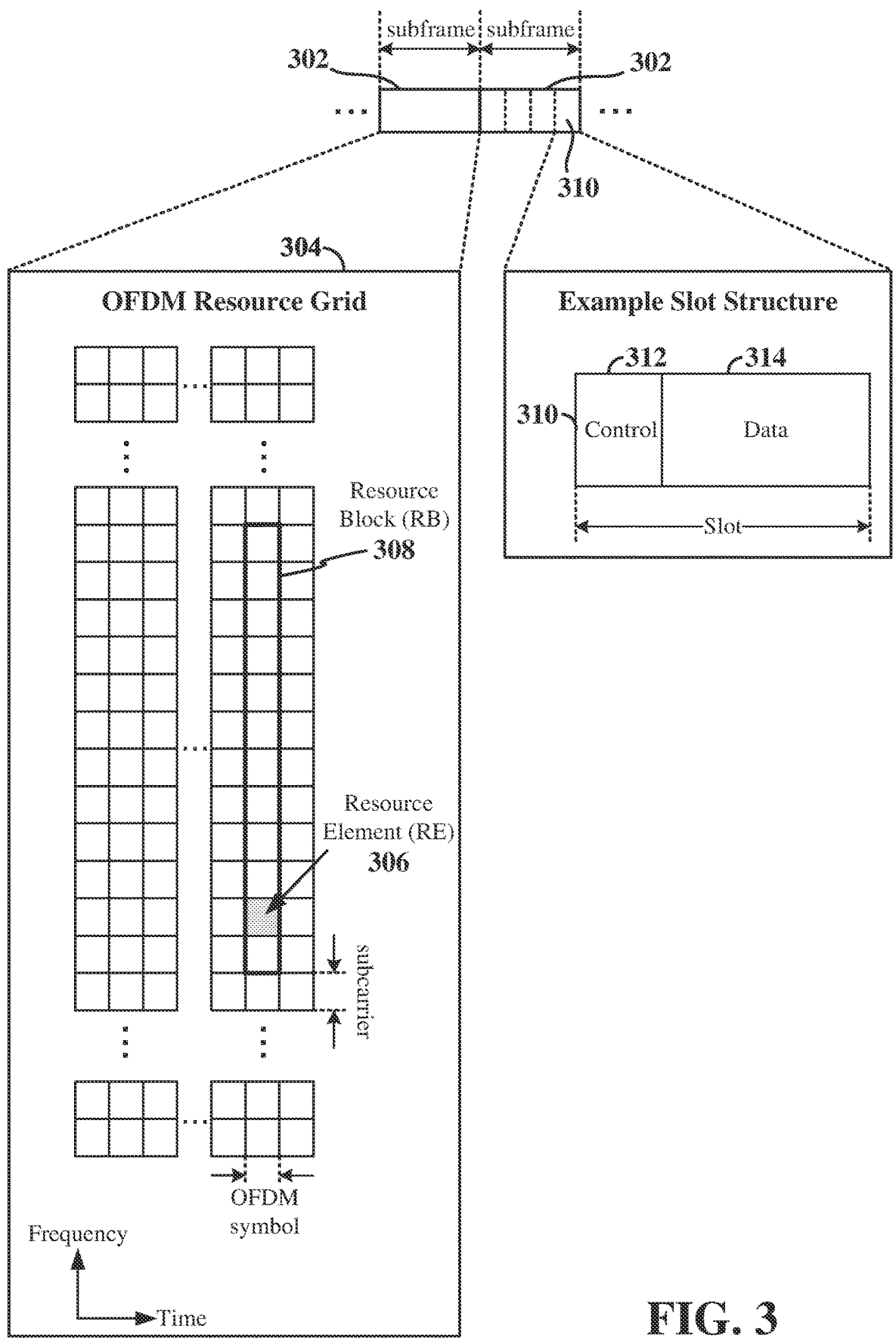
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or MVPs may span the entire bandwidth. Scheduling of scheduled entities (e.g., UEs) for downlink, uplink, or sidelink transmissions involves scheduling one or more resource elements 306 within one or more sub-bands or bandwidth parts (BWPs). Thus, a UE generally utilizes only a subset of the resource grid 304. In some examples, arm RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more. REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBS and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In some examples, the PDCCH may be constructed from a variable number of control channel elements (CCEs), depending on the PDCCH format (or aggregation level). Each CCE includes a number of resource elements (REs) that may be grouped into resource element groups (REGs). Each REG generally may contain, for example, twelve consecutive REs (or nine REs and three DMRS REs) within the same OFDM symbol and the same RB. Each PDCCH format (or aggregation level) supports a different DCI length, in some examples, PDCCH aggregation levels of 1, 2, 4, 8, and 16 may be supported, corresponding to 1, 2, 4, 8, or 16 contiguous CCEs, respectively.

Since the UE is unaware of the particular aggregation level of the PDCCH or whether multiple PDCCHs may exist for the UE in the slot, the UE may perform blind decoding of various PDCCH candidates within the first N control OFDM symbols (as indicated by the slot format of the slot)

based on an expected RNTI (e.g., UE-specific RNTI or group RNTI). Each PDCCH candidate includes a collection of one or more consecutive CCEs based on an assumed DCI length (e.g., PDCCH aggregation level).

To limit the number of blind decodes, search spaces defining UE-specific search spaces (USSs) and common search spaces (CSSs) may be defined. The search space sets (e.g., USSs and CSSs) configured for a UE limit the number of blind decodes that the UE performs for each PDCCH format combination. The starting point (offset or index) of a UE-specific search space may be different for each UE and each UE may have multiple UE-specific search spaces (e.g., one for each aggregation level). The common search space sets consist of CCEs used for sending control information that is common to a group of UEs or to all UEs. Thus, the common search space sets are monitored by multiple UEs in a cell. The starting point (offset or index) of a search space set for group common control information may be the same for all UEs in the group and there may be multiple search space sets defined for group common control information (e.g., one for each configured aggregation level for the group of UEs). The UE may perform blind decoding over all aggregation levels and corresponding USSs or CSSs to determine whether at least one valid DCI exists for the UE.

Figure 4:
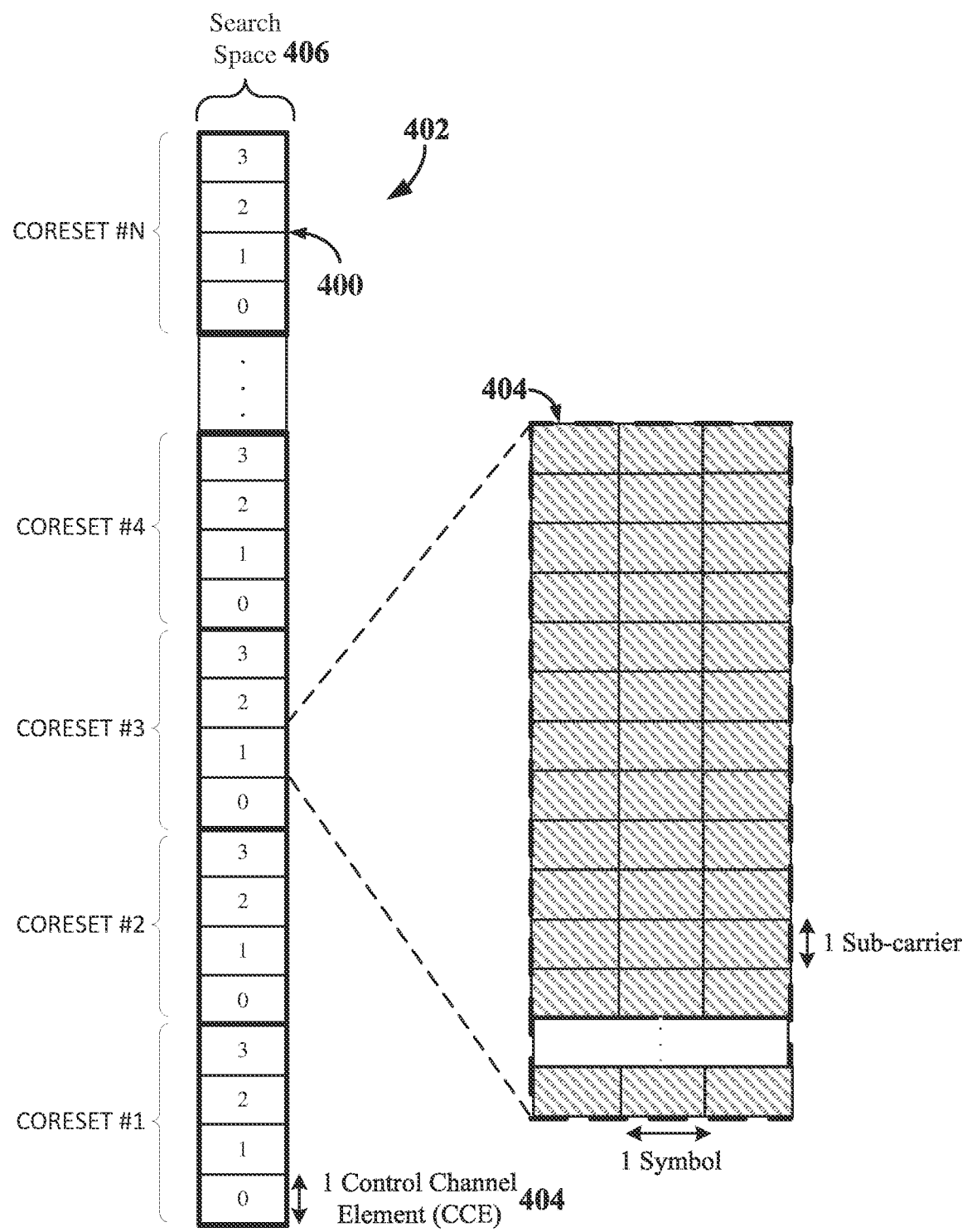
FIG. 4 is a diagram illustrating an example of a control resource set (CORESET) according to some aspects.

FIG. 4 is a schematic illustration of a number of example control resource sets (CORESETs) 400 of a DL control portion 402 of a slot according to some aspects. The slot may correspond, for example, to the slot illustrated in FIG. 3. A CORESET 400 may be configured for group common control information or UE-specific control information and may be used for transmission of a PDCCH including the group common control information or UE-specific control information to a set of one or more UEs. The UE may monitor one or more CORESETs 400 that the UE is configured to monitor for the UE-specific or group common control information.

Each CORESET 400 represents a portion of the DL control portion 402 including a number of sub-carriers in the frequency domain and one or more symbols in the time domain. In the example of FIG. 4, each CORESET 400 includes at least one CCE 404 having dimensions in both frequency and time, sized to span across at least three OFDM symbols. A CORESET having a size that spans across two or more OFDM symbols may be beneficial for use over a relatively small system bandwidth (e.g., 5 MHz). However, a one-symbol CORESET may also be possible.

A plurality of CORESETs 400 indexed as CORESET #1-CORESET #N are shown as occurring during three OFDM symbols in the time domain and occupying a first region of frequency resources in the frequency domain of the DL control portion 402. In the example shown in FIG. 4, each CORESET 400 includes four CCEs 404. It should be noted that this is just one example. In another example, each CORESET 400 may include any suitable number of CCEs 404. The number of CCEs 404 and configuration of CCEs 404 for each CORESET 400 may be dependent, for example, on the aggregation level applied to the PDCCH.

As described above, a search space for a UE is indicated by a set of contiguous CCEs that the UE should monitor for downlink assignments and uplink grants relating to a particular component carrier for the UE. In the example shown in FIG. 4, the plurality of CORESETs 400 may form a search space 406, which may be a USS or a CSS. Within USS, the aggregation level of a PDCCH may be, for example, 1, 2, 4, or 8 consecutive CCEs and within a CSS, the aggregation level of the PDCCH may be, for example 4 or 8 consecutive CCEs. In addition, the number of PDCCH candidates within each search space may vary depending on the aggregation level utilized. For example, for a USS with an aggregation level of 1 or 2, the number of PDCCH candidates may be 6. In this example, the number of CCEs in the USS search space 406 for an aggregation level of 1 may be 6, and the number of CCEs in the USS search space 406 for an aggregation level of 2 may be 12. However, for a USS with an aggregation level of 4 or 8, the number of PDCCH candidates may be 2. In this example, the number of CCEs in the USS search space 406 for an aggregation level of 4 may be 8, and the number of CCEs in the USS search space 406 for an aggregation level of 8 may be 16. For a CSS search space 406, the number of CCEs in the search space 406 may be 16 regardless of the aggregation level.

Figure 5:
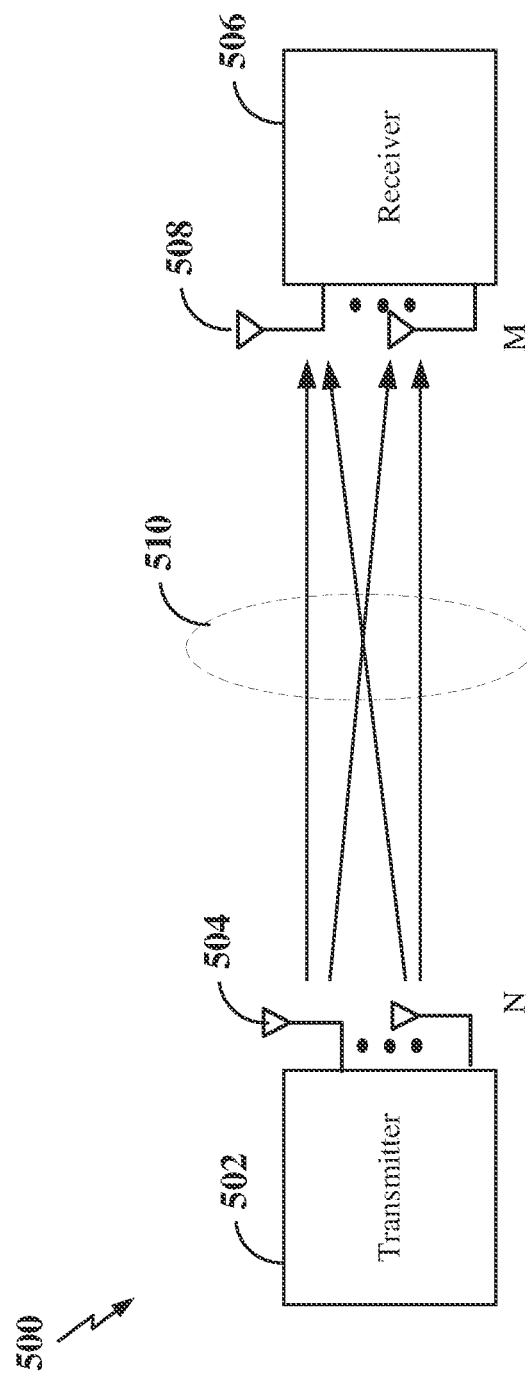
FIG. 5 is a diagram illustrating an example of a wireless communication system supporting beamforming and/or multiple-input multiple-output (MIMO) according to some aspects.

In some aspects of the disclosure, the scheduling entity (e.g., base station) and/or scheduled entity (e.g., UE) may be configured for beamforming and/or multiple-input multiple-output (MIMO) technology. FIG. 5 is a diagram illustrating an example of a wireless communication system 500 supporting beamforming and/or multiple-input multiple-output (MIMO) according to some aspects. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. The multiple transmit antennas 504 and multiple receive antennas 508 may each be configured in a single panel or multi-panel antenna array. Each of the transmitter 502 and the receiver 506 may be implemented, for example, within a scheduling entity (e.g., base station 108), as illustrated in FIGS. 1 and/or 2, a scheduled entity (e.g., UE 106), as illustrated in FIGS. 1 and/or 2, or any other suitable wireless communication device.

The use of such multiple antenna technology enables the wireless communication system 500 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 500 supporting MIMO) is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a sounding reference signal (SRS) transmitted from the UE or other pilot signal). Based on the assigned rank, the base station may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the base station for use in updating the rank and assigning REs for future downlink transmissions.

In one example, as shown in FIG. 5, a rank-2 spatial multiplexing transmission on a 2×2 MIMO antenna configuration will transmit one data stream from each of the transmit antennas 504. Each data stream reaches each of the receive antennas 508 along a different one of the signal paths 510. The receiver 506 may then reconstruct the data streams using the received signals from each of the receive antennas 508.

Beamforming is a signal processing technique that may be used at the transmitter 502 or receiver 506 to shape or steer an antenna beam transmit/receive beam) along a spatial path between the transmitter 502 and the receiver 506. Beamforming may be achieved by combining the signals communicated via antennas 504 or 508 (e.g., antenna elements of an antenna array) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station.

In some examples, to select one or more serving beams (e.g., one or more downlink transmit beams and one or more downlink receive beams) for communication with a UE, the base station may transmit a reference signal, such as a synchronization signal block (SSB), a tracking reference signal (TRS), or a channel state information reference signal (CSI-RS), on each of a plurality of beams (e.g., on each of a plurality of downlink transmit beams) in a beam-sweeping manner. The UE may measure the reference signal received power (RSRP) on each of the beams (e.g., measure RSRP on each of the plurality of downlink transmit beams) and transmit a beam measurement report to the base station indicating the Layer 1 RSRP (L-1 RSRP) of each of the measured beams. The base station may then select the serving beam(s) for communication with the UE based on the beam measurement report. In other examples, when the channel is reciprocal, the base station may derive the particular beam(s) (e.g., the particular downlink beam(s)) to communicate with the UE based on uplink measurements of one or more uplink reference signals, such as a sounding reference signal (SRS).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

In 5G New Radio (NR) systems, particularly for above 6 GHz or millimeter wave (mmWave) systems, beamformed signals may be utilized for downlink channels, including the physical downlink control channel (PDCCH) and physical downlink shared channel (PDSCH). In addition, for UEs configured with beamforming antenna array modules, beamformed signals may also be utilized for uplink channels, including the physical uplink control channel (PUCCH) and the physical uplink shared channel (PUSCH). However, it should be understood that beamformed signals may also be utilized by, for example, enhanced mobile broadband (eMBB) gNBs for sub-6 GHz systems.

Figure 6:
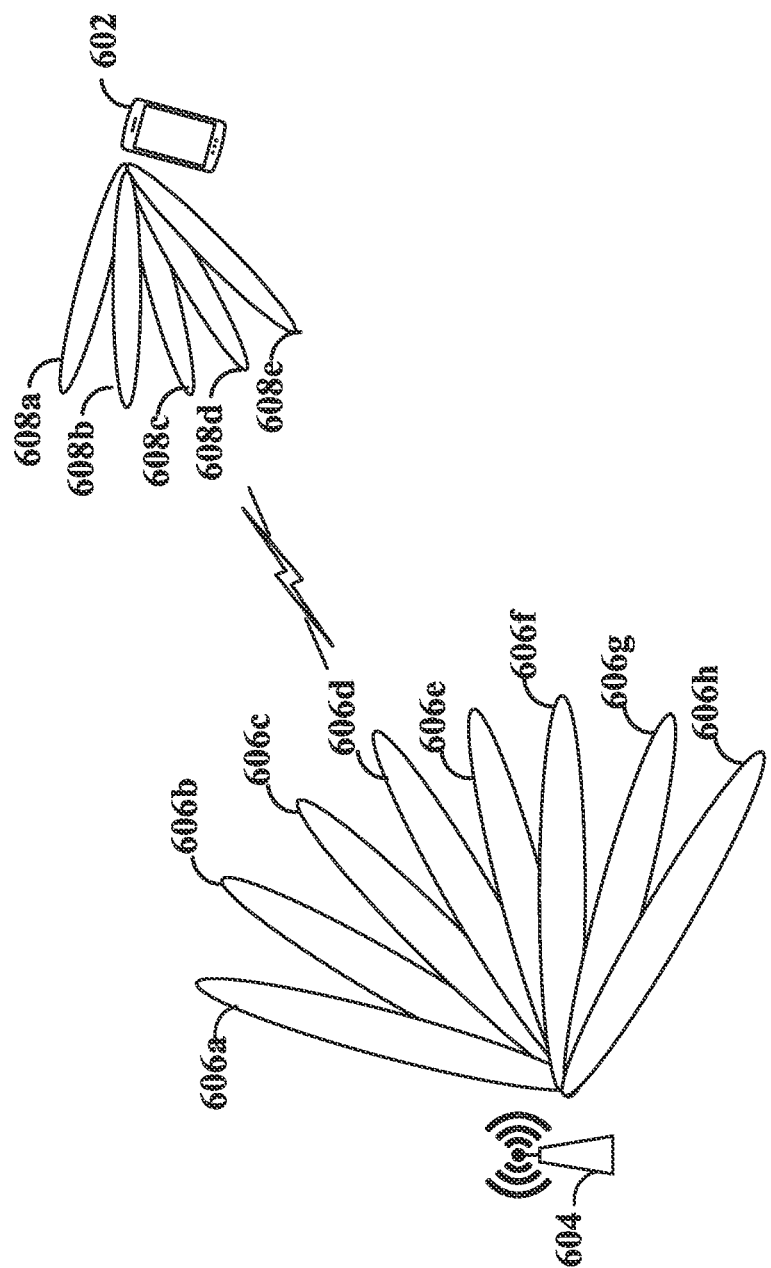
FIG. 6 is a diagram illustrating an example of communication between a base station and a UE using beamforming according to some aspects.

FIG. 6 is a diagram illustrating an example of communication between a base station 604 and a UE 602 using beamforming according to some aspects. The base station 604 may be any of the base stations (e.g., gNBs) or scheduling entities illustrated in FIG. 1, 2, or 4, and the UE 602 may be any of the UEs or scheduled entities illustrated in FIG. 1, 2, or 4.

The base station 604 may generally be capable of communicating with the UE 602 using one or more transmit beams, and the UE 602 may further be capable of communicating with the base station 604 using one or more receive beams. As used herein, the term transmit beam refers to a beam on the base station 604 that may be utilized for downlink or uplink communication with the UE 602. In addition, the term receive beam refers to a beam on the UE 602 that may be utilized for downlink or uplink communication with the base station 604.

In the example shown in FIG. 6, the base station 604 is configured to generate a plurality of transmit beams 606a, 606b, 606c, 606d, 606e, 606f, 606g, and 606h (606a-606h), each associated with a different spatial direction. In addition, the UE 602 is configured to generate a plurality of receive beams 608a, 608b, 608c, 608d, and 608e (608a-608e), each associated with a different spatial direction. It should be noted that while some beams are illustrated as adjacent to one another, such an arrangement may be different in different aspects. For example, transmit beams 606a-606h transmitted during a same symbol may not be adjacent to one another. In some examples, the base station 604 and UE 602 may each transmit more or less beams distributed in all directions (e.g., 360 degrees) and in three-dimensions. In addition, the transmit beams 606a-606h may include beams of varying beam width. For example, the base station 604 may transmit certain signals (e.g., synchronization signal blocks (SSBs)) on wider beams and other signals (e.g., CSI-RSs) on narrower beams.

The base station 604 and UE 602 may select one or more transmit beams 606a-606h on the base station 604 and one or more receive beams 608a-608e on the UE 602 for communication of uplink and downlink signals therebetween using a beam management procedure. In one example, during an initial cell acquisition, the UE 602 may perform a P1 beam management procedure to scan the plurality of transmit beams 606a-606h using the plurality of receive beams 608a-608e to select a beam pair link (e.g., one of the transmit beams 606a-606h and one of the receive beams 608a-608e) for a physical random access channel (PRACH) procedure for initial access to the cell. For example, periodic SSB beam sweeping may be implemented on the base station 604 at certain intervals (e.g., based on the SSB periodicity). Thus, the base station 604 may be configured to sweep or transmit an SSB on each of a plurality of wider transmit beams 606a-606h during the beam sweeping interval. The UE 602 may measure the reference signal received power (RSRP) of each of the SSB transmitted on each of the transmit beams 606a-606h on each of the receive beams 608a-608e of the UE 602. The UE 602 may select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 604 and UE 602 may perform a P2 beam management procedure for beam refinement at the base station 604. For example, the base station 604 may be configured to sweep or transmit a CSI-RS on each of a plurality of narrower transmit beams 606a-606h. Each of the narrower CSI-RS beams may be a sub-beam (not shown) of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control—control element (MAC-CE) signaling by the gNB), or a periodically (e.g., as triggered by the gNB via downlink control information (DCI)). The UE 602 may be configured to scan the plurality of CSI-RS transmit beams 606a-606h on the plurality of receive beams 608a-608e. The UE 602 may then perform beam measurements (e.g., measurements of RSRP, SINR, etc.) of the received CSI-RSs on each of the receive beams 608a-608e to determine the respective beam quality of each of the CSI-RS transmit beams 606a-606h as measured on each of the receive beams 608a-608e.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 606a-606h on one or more of the receive beams 608a-608e to the base station 604. The base station 604 may then select one or more CSI-RS transmit beams on which to communicate downlink and/or uplink control and/or data with the UE 602. In some examples, the selected CSI-RS transmit beam(s) have the highest RSRP from the L1 measurement report. Transmission of the L1 measurement report may occur periodically as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE 602 for each selected serving CSI-RS transmit beam to form a respective beam pair link (BPL) for each selected serving CSI-RS transmit beam. For example, the UE 602 may utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 604 may configure the UE 602 to perform SSB beam measurements and provide an L1 measurement report including beam measurements of SSB transmit beams 606a-606h. For example, the base station 604 may configure the UE 602 to perform SSB beam measurements and/or CSI-RS beam measurements for beam failure detection (BFD), beam failure recovery (BFR), cell reselection, beam tracking (e.g., for a mobile UE 602 and/or base station 604), or other beam optimization purposes.

In addition, when the channel is reciprocal, the transmit and receive beams may be selected using an uplink beam management scheme. In an example, the UE 602 may be configured to sweep or transmit on each of a plurality of receive beams 608a-608e. For example, the UE 602 may transmit an SRS on each beam in the different beam directions. In addition, the base station 604 may be configured to receive the uplink beam reference signals on a plurality of transmit beams 606a-606h. The base station 604 may then perform beam measurements (e.g., RSRP, SINR, etc.) of the beam reference signals on each of the transmit beams 606a-606h to determine the respective beam quality of each of the receive beams 608a-608e as measured on each of the transmit beams 606a-606h.

The base station 604 may then select one or more transmit beams on which to communicate downlink and/or uplink control and/or data with the UE 602. In some examples, the selected transmit beam(s) may have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., transmit beam 606d) on the base station 604 and a single receive beam (e.g., receive beam 608c) on the UE 602 may form a single BPL used for communication between the base station 604 and the UE 602. In another example, multiple CSI-RS transmit beams (e.g., transmit beams 606c, 606d, and 606e) on the base station 604 and a single receive beam (e.g., receive beam 608c) on the UE 602 may form respective BPLs used for communication between the base station 604 and the UE 602. In another example, multiple CSI-RS transmit beams (e.g., transmit beams 606c, 606d, and 606e) on the base station 604 and multiple receive beams (e.g., receive beams 608c and 608d) on the UE 602 may form multiple BPLs used for communication between the base station 604 and the UE 602. In this example, a first BPL may include transmit beam 606c and receive beam 608c, a second BPL may include transmit beam 606d and receive beam 608c, and a third BPL may include transmit beam 606e and receive beam 608d.

Generally speaking, two signals transmitted from the same antenna port should experience the same radio channel, whereas transmitting signals from two different antenna ports should experience different radio conditions. In some cases, transmitted signals from two different antenna ports experience radio channels having common properties. In such cases, the antenna ports are said to be in quasi-colocation (QCL). Two antenna ports may be considered quasi co-located if properties of the channel over which a symbol on one antenna port is conveyed can be inferred from the channel over which a symbol on the other antenna port is conveyed. In 5G NR, UEs are equipped with channel estimation, frequency offset error estimation and synchronization procedures for processing QCL. For example, if the UE knows that the radio channels corresponding to two different antenna ports are QCL in terms of Doppler shift, then the UE can determine the Doppler shift for one antenna port and then apply the result on both antenna ports for channel estimation. This avoids the UE having to calculate Doppler shift for both antenna ports separately.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSPCPs (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

QCL information may be conveyed via transmission configuration indicator (TCI) states. A TCI state includes or maps to QCL relationship configurations between one or more reference signals (e.g., SSB, CSI-RS, and SRS) and downlink (DL) or uplink (UL) transmissions. For example, a TCI state may include a DL TCI for a downlink transmission, a joint DL/UL TCI, or spatial relation information for an UL transmission. For example, the TCI state can include one or more reference signal IDs, each identifying an SSB resource, a CSI-RS resource, or an SRS resource. Each resource (SSB, CSI-RS, or SRS resource) indicates the particular beam, frequency resource, and OFDM symbol on which the corresponding reference signal is communicated. Thus, in examples in which the TCI state indicates QCL-TypeD for a downlink or uplink transmission, the reference signal ID may be utilized to identify the beam to be used for the downlink or uplink transmission based on the QCL relationship with an associated reference signal (e.g., SSB, CSI-RS, or SRS) indicated in the TCI state.

Figure 7:
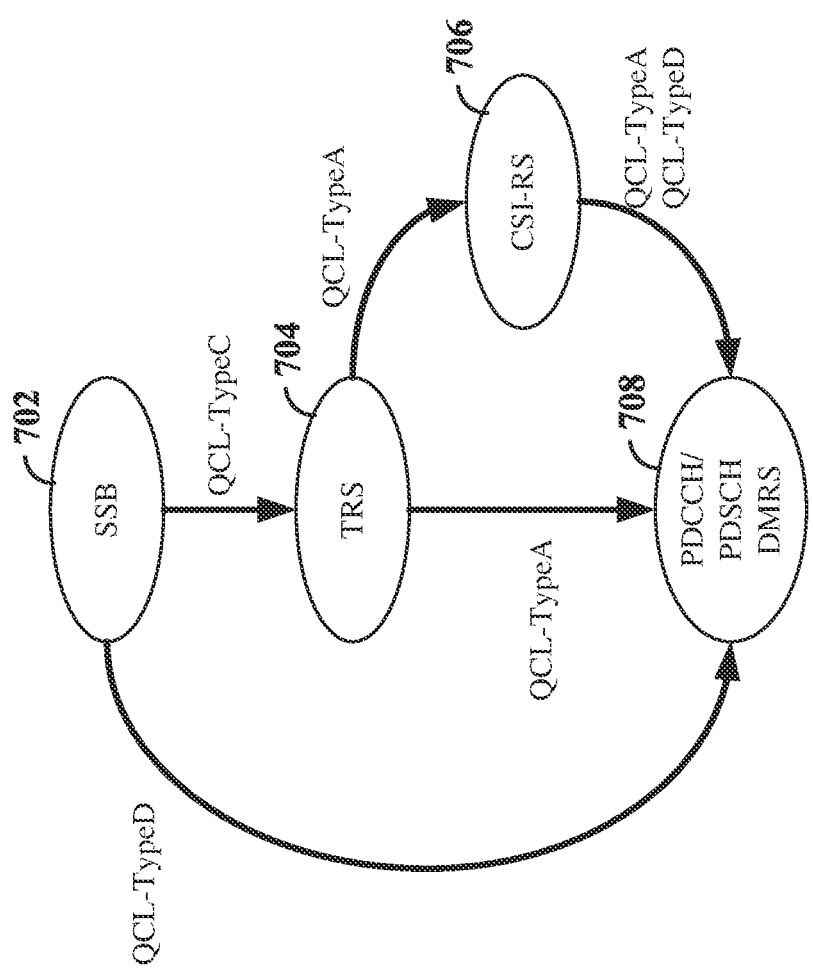
FIG. 7 is a diagram illustrating exemplary QCL relationships between downlink reference signals and other downlink transmissions according to some aspects.

FIG. 7 is a diagram illustrating exemplary QCL relationships between downlink reference signals and other downlink transmissions according to some aspects. As described above, a UE can be configured (e.g., via RRC signaling) with TCI states to decode downlink transmissions, such as PDCCH and PDSCH transmissions. Each TCI state includes parameters for configuring the QCL relationship between one or two downlink reference signals and the DMRS ports of a PDCCH or PDSCH.

In the example shown in FIG. 7, three downlink reference signals, SSB 702. TRS 704, and CSI-RS 706 are illustrated. The QCL relationships between these downlink reference signals and between the downlink reference signals and the PDCCH/PDSCH DMRS ports 708 are shown. Each QCL relationship may be indicated via, for example, a TCI state. For example, the TCI state for a TRS 704 may indicate a QCL-TypeC relationship with an SSB 702. In addition, the TCI state for a CSI-RS 706 may indicate a QCL-TypeA relationship with a TRS 704. Furthermore, the TCI state for a PDCCH/PDSCH DMRS 708 may indicate a QCL-TypeA and/or QCL-TypeD relationship with a CSI-RS 706 and/or a QCL-TypeD relationship with an SSB 702.

Each TCI state may be configured via RRC using, for example, the following format.

```
TCI State ::=
    tci-StateID         SEQUENCE {
    qcl-Type1               TCI-StateID,
    qcl-Type2               QCL-Info,
    qcl-Type3               QCL-Info
    ...
}
QCL-Info ::=            SEQUENCE {
    cell                    ServCellIndex
    bwp-ID                  BWP-ID
    referenceSignal         CHOICE {
        csi-rs                  NZP-CSI-RS-ResourceID,
        ssb                     SSB-Index
    },
    qcl-Type                Enumerated (typeA, typeB, typeC,
                            typeD),
    ...
}
```

Once configured, the base station may transmit a TCI state activation message to the UE to activate a TCI state on the UE for PDCCH or PDSCH transmissions. In some examples, the TCI state activation message is a medium access control (MAC) control element (MAC-CE). For example, the base station may activate a TCI state for a PDCCH downlink transmission using a UE-specific PDCCH MAC-CE.

Figure 8:
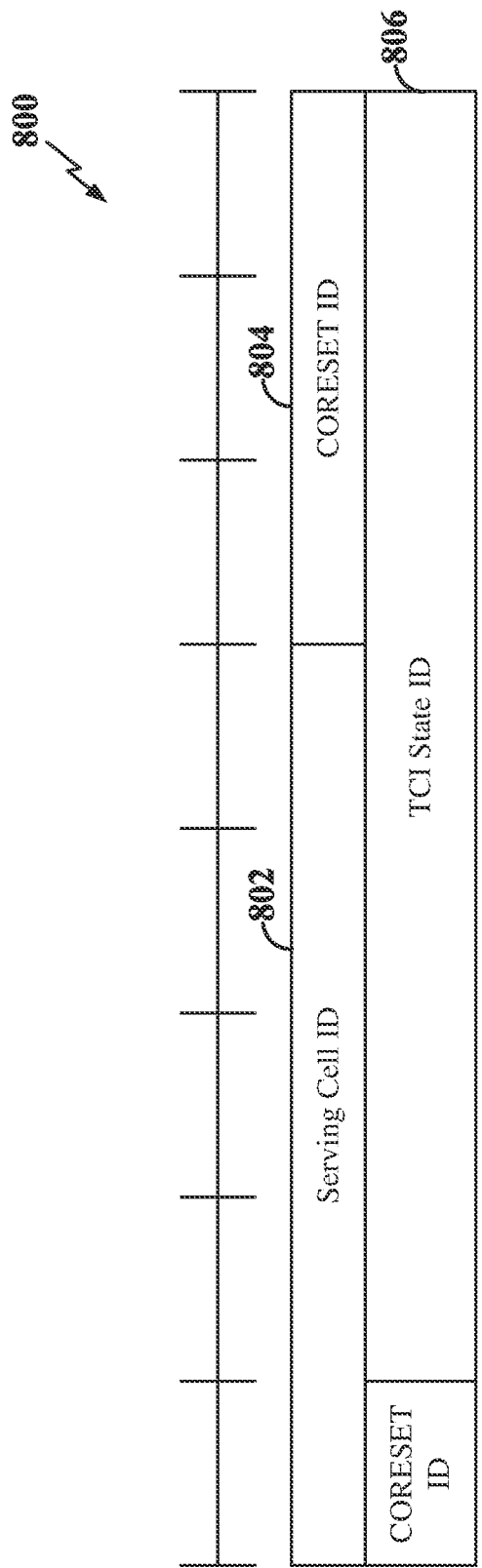
FIG. 8 is a diagram illustrating an example of a physical downlink control channel (PDCCH) medium access control (MAC) control element (MAC-CE) activating a single transmission configuration indicator (TCI) state according to some aspects.

FIG. 8 is a diagram illustrating an example of a PDCCH MAC-CE 800 according to some aspects. In the example shown in FIG. 8, the PDCCH MAC-CE 800 has a fixed size of sixteen bits. The PDCCH MAC-CE 800 includes a serving cell identifier (ID) 802 identifying a serving cell associated with the TCI state, a control resource set (CORESET) identifier (ID) 804 identifying a CORESET associated with the TCI state, and a TCI state identifier (ID) 806 identifying a TCI state activated for the CORESET in the serving cell.

Figure 9:
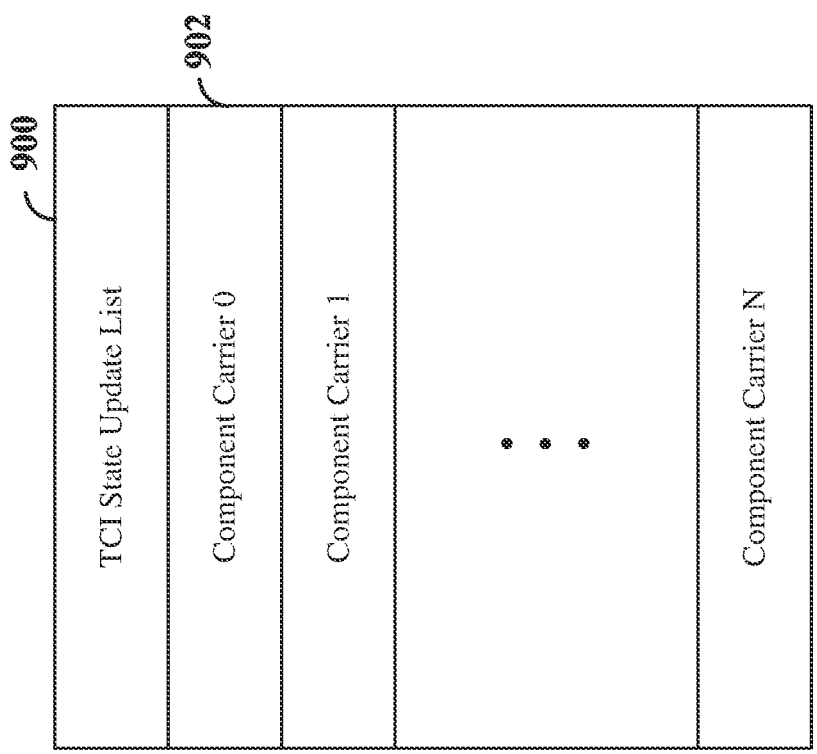
FIG. 9 is a diagram illustrating an example of a TCI state update list according to some aspects.

In some examples, the serving cell may be configured as part of a TCI state update list. FIG. 9 is a diagram illustrating an example of a TCI state update list 900 according to some aspects. The TCI state update list 900 may include, for example, a plurality of component carriers (e.g., Component Carrier 0, Component Carrier 1, . . . , Component Carrier N) 902. Each component carrier 902 is associated with a respective cell, and thus may be referenced by a serving cell ID.

Referring to FIGS. 8 and 9, if the serving cell ID 802 included in the PDCCH MAC-CE 800 activating a single TCI state 806 for a CORESET 804 is included in the TCI state update list 900, the PDCCH MAC-CE 800 is applied to all of the component carriers 902 (e.g., all of the cells) in the TCI state update list 900. Thus, the UE may utilize the same TCI state 806 to receive PDCCH transmissions from each of the serving cells (e.g., component carriers 902) in the TCI state update list 900.

High-speed trains (HSTs) may utilize single frequency networks (SFN) to facilitate wireless communication. A user equipment (UE) located within an HST may move in a predefined path or trajectory (e.g., where a train track defines the predefined path or trajectory) at velocities exceeding 300 kilometers per hour. Remote radio heads or transmission and reception points (TRPs) may be deployed along the predefined path and associated with a base station. In SFNs, multiple TRPs may serve a single UE and transmit on the same time-frequency resource. Because of densification, SFN may be used to provide spatial diversity gain, where adjacent TRPs transmit the same data in a same time-frequency resource to provide the UE with a signal (carrying the data) from multiple TRPs simultaneously.

Figure 10:
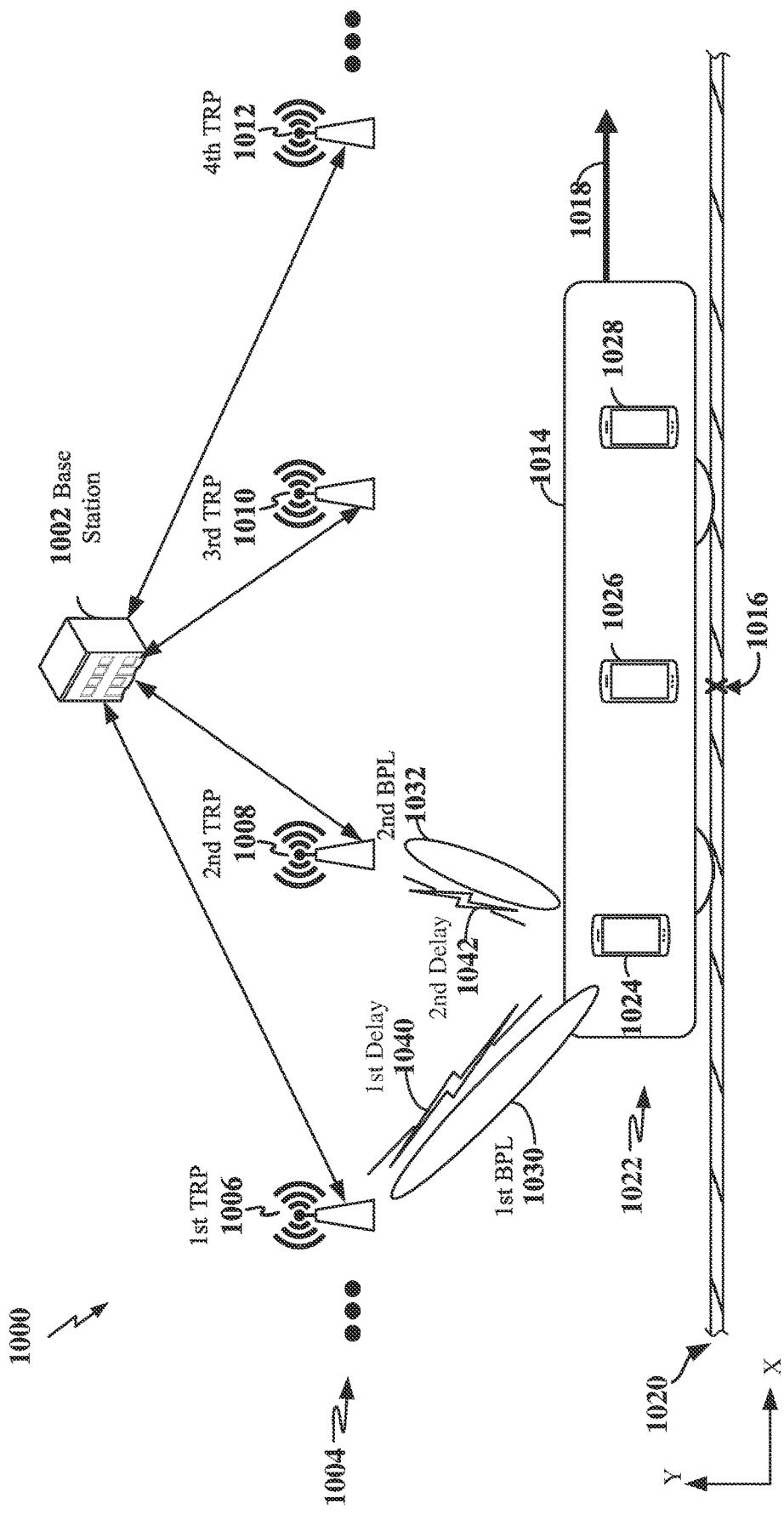
FIG. 10 is a right-side elevation view of a vehicle in a high-speed train—single frequency network according to some aspects.

FIG. 10 is a right-side elevation view of a vehicle 1014 (e.g., a high-speed train car) in a high-speed train (HST) single frequency network (HST-SFN) 1000 according to some aspects. As shown in FIG. 10, the HST-SFN 1000 includes a base station 1002 utilizing a plurality of transmission and reception points (TRPs) 1004 deployed in a remote radio head configuration. In the illustrated example, the plurality of TRPs 1004 include a first TRP 1006, a second TRP 1008, a third TRP 1010, and a fourth TRP 1012; however, any number of TRPs is within the scope of the disclosure. The HST-SFN 1000 also includes the vehicle 1014 (e.g., the high-speed train car) having a centerline located at a position marked by the letter X 1016 and indicates that the vehicle 1014 is moving along an X-axis in a direction described by a vector 1018 along a path 1020 (e.g., a high-speed track). The vehicle 1014 may transport a plurality of UEs 1022.

The plurality of UEs 1022 may include a first UE 1024, a second UE 1026, and a third UE 1028. Any number of UEs, from one to many, are within the scope of the disclosure. The plurality of UEs 1022 may include a mobile handset, a tablet, a mobile phone, a customer premise equipment (CPE), or the like. The first UE 1024 is offset from the centerline X 1016 of the vehicle 1014; however, because the first UE 1024 is located within the vehicle 1014, when the vehicle 1014 is moving, the velocity, acceleration, and direction of movement of the first UE 1024 may be considered to be the same as that of the vehicle 1014.

The plurality of TRPs 1004 may be located at positions adjacent to the path 1020 (e.g., mounted adjacent to one another on the walls of a tunnel through which the path 1020 transits, or on poles, towers, buildings, or overhead supports staggered along the length of the path 1020). As described herein, the first UE 1024 may be moving with the plurality of UEs 1022 at a same velocity, in the same direction, and along the same path 1020 (e.g., defined by train tracks) of the vehicle 1014 relative to each of the plurality of TRPs 1004 associated with the base station 1002. In the example of FIG. 10, the first UE 1024 is moving along the X-axis in the direction indicated by the vector 1018 (e.g., toward the right). The plurality of UEs 1022 may be moving at a constant speed or with acceleration.

As shown in FIG. 10, the first UE 1024 may communicate with the first TRP 1006 via a first beam pair link 1030. The first beam pair link may include a beam at the first TRP for transmission of downlink and reception of uplink (collectively referred to as the transmit beam) and include a beam of the first UE 1024 for the reception of downlink and transmission of uplink (collectively referred to as the receive beam). The first UE 1024 may also communicate with the second TRP 1008 via a second beam pair link 1032. Communication between the first UE 1024 and two or more TRPs is within the scope of the disclosure.

It should be understood that each of the plurality of UEs 1022 may be in communication with each of the plurality of TRPs 1004 via respective beam pair links. While the description herein may use an example of communication between the first UE 1024 and the first TRP 1006 and the second TRP 1008 (via the first beam pair link 1030 and the second beam pair link 1032, respectively), the first UE 1024 may be in communication with any two or more of the plurality of TRPs 1004 using respective beam pair links while implementing the concepts described herein. Further, each of the plurality of TRPs 1004 may communicate with each of the plurality of UEs 1022 via respective beam pair links and implement the concepts described herein.

In some examples, the first UE 1024 may receive a downlink transmission (e.g., a PDCCH or PDSCH) from the base station 1002 via the first TRP 1006 and the first beam pair link 1030 and via the second TRP 1008 and the second beam pair link 1032. Each TRP 1006 and 1008 may transmit the same downlink transmission (e.g., the same PDCCH or PDSCH) on the same time-frequency resources. The downlink transmission received from the first TRP 1006 on the first beam pair link 1030 may have a first delay 1040 (e.g., a delay between transmission from the first TRP 1006 and reception at the first UE 1024). In addition, the downlink transmission received from the second TRP 1008 on the second beam pair link 1032 may have a second delay 1042 (e.g., a delay between transmission from the second TRP 1008 and reception at the first UE 1024).

The different delays result in different Doppler shifts and different power delay profiles of the downlink transmission observed at the UE. To compensate for the different delays 1040 and 1042, the base station 1002 may apply beam-specific timing precompensation to the downlink transmission from one of the first or second TRPs 1006 or 1008. The TRP selected for timing precompensation may be referred to herein as the Doppler anchor TRP. The Doppler anchor TRP (e.g., first TRP 1006 or second TRP 1008) may apply the beam-specific timing precompensation to the downlink transmission to reduce the time spread delay of the power delay profiles of the respective downlink transmissions of the first and second TRPs 1006 and 1008, thereby reducing the Doppler spread of the downlink transmission.

The base station 1002 may select the downlink transmit beams of the beam pair links 1030 and 1032 for each of the first and second TRPs 1006 and 1008 for the downlink transmission to the first UE 1024 by activating respective TCI states associated with each of the beam pair links 1030 and 1032. For example, as described above, the base station 1002 may configure a plurality of TCI states via, for example, RRC signaling. The base station 1002 may then activate a respective TCI state for each beam pair link 1030 and 1032 for a PDCCH transmission or a PDSCH transmission by transmitting a TCI state activation message (e.g., a MAC-CE) to the first UE 1024. In examples in which the downlink transmission is a PDCCH, the base station 1002 may transmit a PDCCH MAC-CE to the first UE 1024. In some aspects, the PDCCH MAC-CE includes two TCI states, one for each of the TRPs 1006 and 1008. Thus, the base station 1002 may transmit a single PDCCH MAC-CE to activate the respective TCI states for a PDCCH transmission from each of the TRPs 1006 and 1008 to the first UE 1024.

Figure 11:
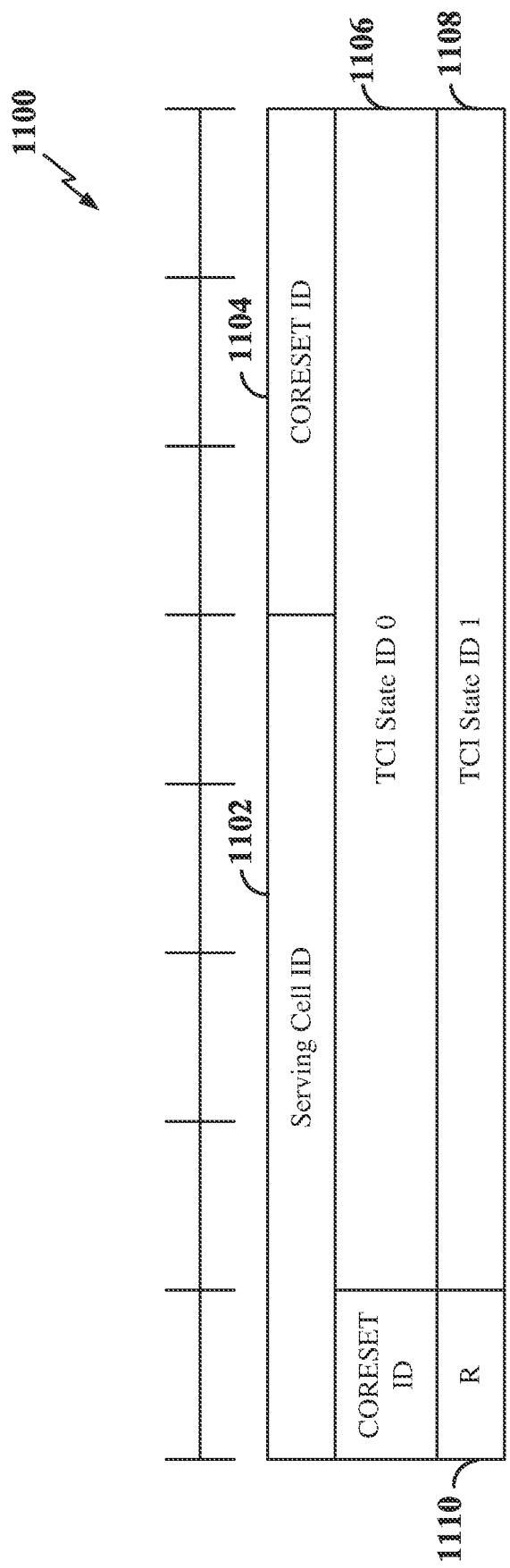
FIG. 11 is a diagram illustrating an example of a PDCCH MAC-CE activating two TCI states according to some aspects.

FIG. 11 is a diagram illustrating an example of a PDCCH MAC-CE 1100 activating two TCI states according to some aspects. In the example shown in FIG. 11, the PDCCH MAC-CE 1100 has a fixed size of twenty-four bits. The PDCCH MAC-CE 1100 includes a serving cell identifier (ID) 1102 identifying a serving cell associated with the TCI states, a control resource set (CORESET) identifier (ID) 1104 identifying a CORESET associated with the TCI states, a first TCI state identifier (TCI State ID 0) 1106 identifying a first TCI state that may be activated for the CORESET in the serving cell, a second TCI state ID (TCI State ID 1) 1108 identifying a second TCI state that may be activated for the CORESET in the serving cell, and a reserved field 1110. Each TCI state ID 1106 and 1108 may be associated with a different respective TRP in a SFN (e.g., a HST-SFN). In some examples, the first TCI state ID (TCI State ID 0) 1106 may be associated with the Doppler anchor TRP that applies beam-specific timing precompensation in the SFN.

In some examples, the CORESET may be configured (e.g., via RRC signaling) as an SFN CORESET. However, the actual PDCCH transmission to the UE may be SFN or non-SFN. In this example, the reserved field (R) 1110 may indicate whether one or both of the TCI states 1106 and 1108 are to be activated for the CORESET 1104. For example, if R=0, the first TCI state 1106 may be activated on the UE for the CORESET associated with each of the plurality of component carriers in the TCI state update list, whereas if R=1, both the first and second TCI states 1106 and 1108 may be activated on the UE for the CORESET associated with each of the plurality of component carriers in the TCI state update list. Thus, in this example, a single PDCCH MAC-CE may be used to select between SFN and non-SFN operation for an SFN configured CORESET. As a result, two TCI states 1106 and 1108 may be included in the PDCCH MAC-CE 1100 for an SFN CORESET and the TCI states (e.g., 1106 and/or 1108) selected for activation are indicated via the reserved field 1110.

In some examples, the serving cell ID 1102 may be included within a TCI state update list that includes a plurality of component carriers (e.g., cell IDs), as shown, for example, in FIG. 9. If the serving cell ID 1102 is included in a TCI state update list, the UE receiving the PDCCH MAC-CE 1100 may activate at least one of the two TCI states 1106 and 1108 on the UE for each component carrier in the TCI state update list.

Figure 12:
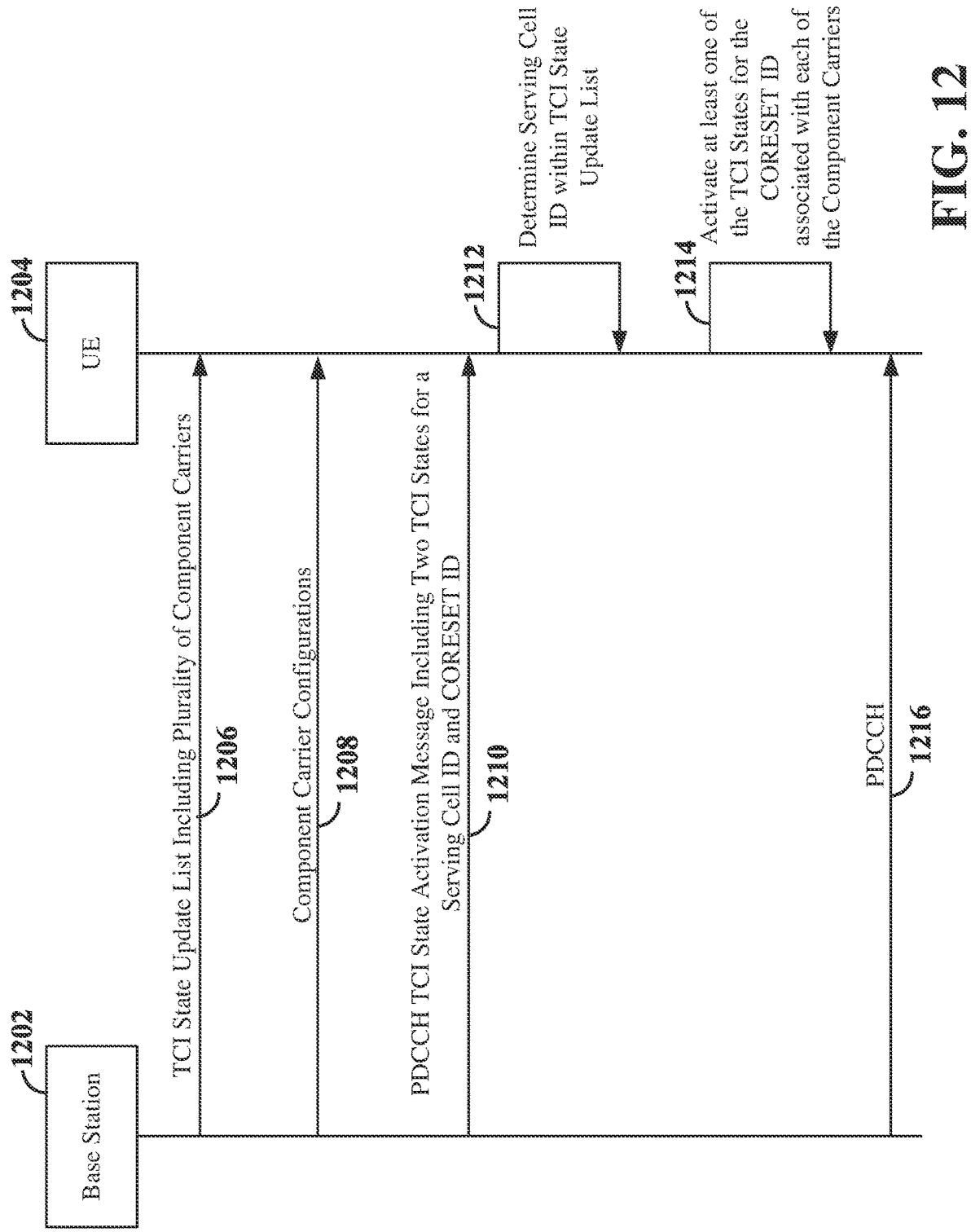
FIG. 12 is a signaling diagram illustrating exemplary signaling for TCI state activation of up to two TCI states for each of a plurality of component carriers included in a TCI state update list according to some aspects.

FIG. 12 is a signaling diagram illustrating exemplary signaling for TCI state activation of up to two TCI states for each of a plurality of component carriers included in a TCI state update list according to some aspects. In some examples, the exemplary signaling 1200 may be utilized in a single frequency network (SFN). In some examples, the exemplary signaling 1200 may be utilized in a high-speed train (HST) single frequency network (HST-SFN).

In the example shown in FIG. 12, a base station 1202 may be in wireless communication with a user equipment (UE) 1204. The base station 1202 may have a plurality of TRPs utilized in a remote radio head configuration. The UE 1204 may be in wireless communication with the base station 1202 via two or more of the plurality of TRPs. The base station 1202 may correspond, for example, to any of the base stations (e.g., gNBs) or other scheduling entities shown in any of FIGS. 1, 2, 5, 6, and/or 10. The UE 1204 may correspond, for example, to any of the UEs or other scheduled entities shown in any of FIGS. 1, 2, 5, 6, and/or 10.

At 1206, the base station 1202 transmits a TCI state update list including a plurality of component carriers (e.g., cell IDs) to the UE 1204. The TCI state update list may be transmitted, for example, via an RRC message. In some examples, the configured list of component carriers for simultaneous TCI state update activation may be the same for both SFN and non-SFN configurations. In other examples, the base station 1202 may transmit separate TCI state update lists for SFN and non-SFN configurations. In some examples, the TCI state update list may be based on the UE capability for simultaneous TCI state activation across multiple component carriers. In examples in which the UE capability is the same for both SFN and non-SFN configurations, a single TCI state update list may be transmitted to the UE that is applicable to both SFN and non-SFN operations. In examples in which the UE capability is different for SFN and non-SFN configurations, separate TCI state update lists may be transmitted to the UE for SFN and non-SFN operations.

At 1208, the base station 1202 transmits component carrier configurations (e.g., via RRC signaling), which may include, for example, a respective configuration of each of the plurality of component carriers in the TCI state update list. In some examples, the component carrier configurations may include a respective SFN configuration of each of the plurality of component carriers. For example, the SFN configurations may configure the UE for SFN PDCCH reception per CORESET across bandwidth parts of a single component carrier or across multiple component carriers, per bandwidth part (BWP) of a single component carrier or across multiple component carriers, or per component carrier. Thus, each SFN configuration may indicate whether the corresponding component carrier supports an SFN operation for PDCCH reception within one or more CORESETs of the component carrier. In some examples, the RRC SFN configurations of each of the component carriers may be the same or different for PDCCH reception and PDSCH reception.

At 1210, the base station 1202 transmits a TCI state activation message to the UE 1204. The TCI state activation message may include a first TCI state, a second TCI state, a serving cell ID, and a CORESET ID, as shown, for example, in FIG. 11. In some examples, the TCI state activation message is a MAC-CE (e.g., a PDCCH MAC-CE).

At 1212, the UE 1204 determines that the serving cell ID included in the TCI state activation message is within the TCI state update list. For example, the UE can compare the serving cell ID included in the TCI state activation message with the TCI state update list to determine that the serving cell ID is within the TCI state update list.

At 1214, the UE 1204 activates at least one of the TCI states included in the TCI state activation message for the CORESET ID associated with each of the plurality of component carriers in the TCI state update list. In some examples, the UE 1204 may activate both TCI states for the CORESET ID associated with each of the component carriers (e.g., cells) in the TCI state update list. For example, the SFN configuration of each of the component carriers in the TCI state update list may indicate that each of the component carriers supports the SFN operation for the CORESET ID, and as such, both TCI states may be activated for all of the component carriers in the TCI state update list. In some examples, the base station 1202 may be prohibited from including component carriers in the TCI state update list that do not support SFN operation for the CORESET ID. For example, the base station 1202 may ensure that the component carriers included in the same TCI state update list are either all configured for SFN operation or all configured for non-SFN operation. Thus, a mixed mode (SFN and non-SFN) TCI state update list may not be allowed. In some examples, the first TCI state (e.g., TCI State ID 0 1106, shown in FIG. 11) included in the TCI state activation message may be associated with a TRP that serves as a Doppler anchor TRP for the UE.

In other examples, the UE 1204 may activate only one of the TCI states for each of the component carriers in the TCI state update list. For example, if the SFN configuration of each of the component carriers indicates that none of the component carriers or that not all of the component carriers supports SFN operation for the CORESET ID, the UE may activate only a single TCI state for each of the component carriers. In some examples, the UE 1204 may be configured to activate the first TCI state (e.g., TCI State ID 0 1106, shown in FIG. 11) included in the TCI state activation message. In other examples, the reserved field in the PDCCH MAC-CE may indicate activation of either the first TCI state or the second TCI state for each of the component carriers.

In other examples, the UE may activate both TCI states for a first set of the plurality of component carriers in the TCI state update list that do support SFN operation for the CORESET ID, but may activate only a single TCI state for a second set of the plurality of component carriers in the TCI state update list that do not support SFN operation for the CORESET ID. In this example, the reserved field in the PDCCH MAC-CE may indicate whether the UE should activate the first TCI state or the second TCI state for the second set of the plurality of component carriers.

At 1216, the base station 1202 may transmit a PDCCH to the UE 1204. The PDCCH transmission may be SFN or non-SFN based on the TCI state activation message e.g., PDCCH MAC-CE). For example, if the PDCCH MAC-CE activates a single TCI state, regardless if the CORESET is configured for SFN operation, the CORESET is treated as a non-SFN CORESET for reception of the PDCCH. In an example, the reserved field in the PDCCH MAC-CE may indicate that only one of the TCI states should be activated for the SFN CORESET. As another example, not all of the component carriers in the TCI state update list may support the SFN operation, and as such, only one of the TCI states may be activated.

In the example shown in FIGS. 11 and 12, the UE 1204 may be configured to identify the SFN and non-SFN TCI states to be applied to the component carriers in the TCI state update list based on only the two TCI states included in the TCI state activation message (e.g., PDCCH MAC-CE). In other examples, the TCI state activation message (e.g., PDCCH MAC-CE) may explicitly jointly indicate separate SFN and non-SFN PDCCH TCI states.

Figure 13:
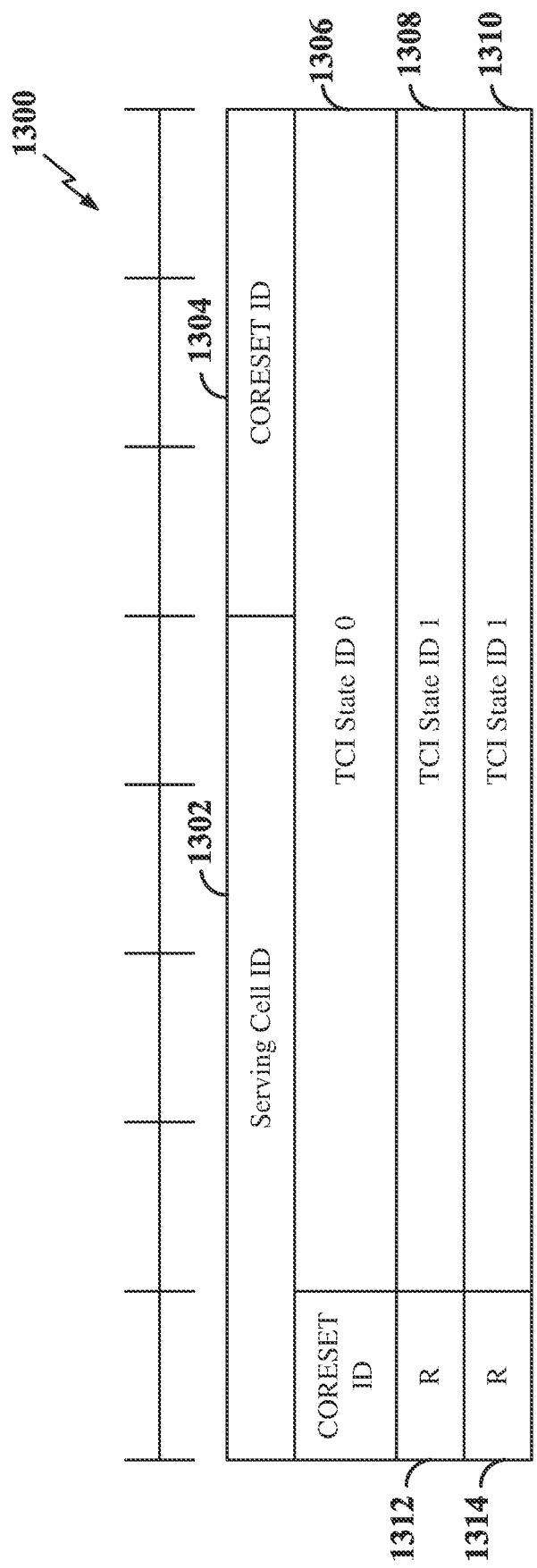
FIG. 13 is a diagram illustrating an example of a PDCCH MAC-CE configured to activate TCI states for either single frequency network (SFN) or non-SFN operation according to some aspects.

FIG. 13 is a diagram illustrating an example of a PDCCH MAC-CE configured to activate TCI states for either single frequency network (SFN) or non-SFN operation according to some aspects. In the example shown in FIG. 13, the PDCCH MAC-CE 1300 has a fixed size of thirty-two bits. The PDCCH MAC-CE 1300 includes a serving cell identifier (ID) 1302 identifying a serving cell associated with the TCI states, a control resource set (CORESET) identifier (ID) 1304 identifying a CORESET associated with the TCI states, a first TCI state identifier (TCI State ID 0) 1306 identifying a first TCI state that may be activated for the CORESET in the serving cell, a second TCI state ID (TCI State ID 1) 1308 identifying a second TCI state that may be activated for the CORESET in the serving cell, a third TCI state ID (TCI State ID 2) 1310 identifying a third TCI state that may be activated for the CORESET in the serving cell, reserved fields 1312 and 1314.

The PDCCH MAC-CE 1300 shown in FIG. 13 includes more than two (e.g., three TCI states for the CORESET ID. One of the TCI states (e.g., the first TCI state 1306) may be used for non-SFN operation, whereas the other two TCI states (e.g., TCI states 1308 and 1310) may be used for SFN operation of the CORESET ID. For example, the second and third TCI states 1308 and 1310 (e.g., the SFN TCI states) may be activated for all component carriers in the TCI state update list in response to the SFN configuration of the serving cell indicating that the serving cell supports SFN operation for the CORESET ID, while the first TCI state 1306 (e.g., the single non-SFN TCI state) may be activated for all component carriers in the TCI state update list in response to the SFN configuration of the serving cell indicating that the serving cell does not support SFN operation for the CORESET ID. Here, an assumption may be made that all component carriers in the TCI state update list either support SFN operation or do not support SFN operation. As another example, the second and third TCI states 1308 and 1310 may be activated for a first set of the plurality of component carriers that support SFN operation for the CORESET ID, while the first TCI state 1306 may be activated for a second set of the plurality of component carriers that do not support SFN operation for the CORESET ID.

The SFN and non-SFN TCI states may be configured (e.g., by the original equipment manufacturer (OEM) or via RRC signaling) or may be indicated, for example, using one or both of the reserved fields (R) 1312 and 1314. For example, if R=0 in field 1312 and R=0 in field 1314, the first TCI state 1306 is the non-SFN TCI state and the second and third TCI states 1308 and 1310 are SFN TCI states. However, if R=1 in field 1312 and R=0 in field 1314, the second TCI state 1308 is the non-SFN TCI state and the first and third TCI states 1306 and 1310 are SFN TCI states. Moreover, if R=0 in field 1312 and R=1 in field 1314, the third TCI state 1310 is the non-SFN TCI state and the first and second TCI states 1306 and 1308 are SFN TCI states.

As another example, the reserved fields 1312 and/or 1314 may be utilized to indicate whether to activate a single TCI state (e.g., TCI state 1306) or two TCI states (e.g., TCI states 1308 and 1310), regardless of whether the CORESET is an SFN CORESET. For example, the reserved field 1312 may indicate whether the first TCI state (non-SFN TCI state) 1306 or the SFN TCI states 1308 and 1310 are to be activated for the CORESET 1304. For example, if R=0 in field 1312, the first TCI state 1306 may be activated on the UE for the CORESET associated with each of the plurality of component carriers in the TCI state update list, whereas if R=1, both the second and third TCI states 1308 and 1310 may be activated on the UE for the CORESET associated with each of the plurality of component carriers in the TCI state update list.

Figure 14:
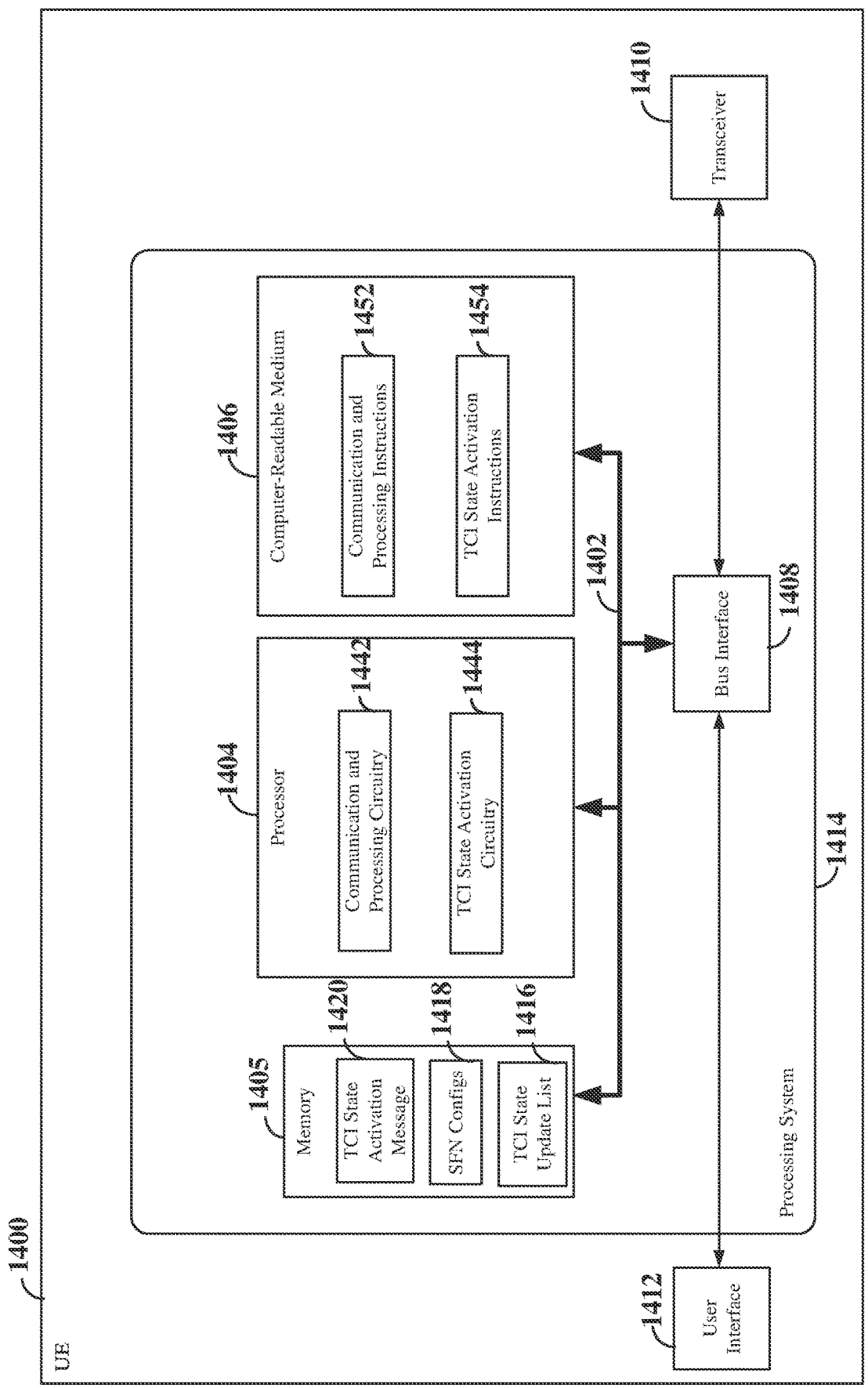
FIG. 14 is a block diagram illustrating an example of a hardware implementation of a user equipment (UE) employing a processing system according to some aspects.

FIG. 14 is a block diagram illustrating an example of a hardware implementation of a user equipment (UE) 1400 employing a processing system 1414 according to some aspects. The UE 1400 may be any of the UEs or other scheduled entities illustrated in any one or more of FIGS. 1, 2, 5, 6, 10, and/or 12.

In accordance with various aspects of the disclosure, an element, or any portion of an element, or any combination of elements may be implemented with a processing system 1414 that includes one or more processors, such as processor 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1400 may be configured to perform any one or more of the functions described herein. That is, the processor 1404, as utilized in the UE 1400, may be used to implement any one or more of the methods or processes described and illustrated, for example, in FIGS. 15-18.

The processor 1404 may in some instances be implemented via a baseband or modem chip and in other implementations, the processor 1404 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 play be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits, including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, are not described any further.

A bus interface 1408 provides an interface between the bus 1402 and a transceiver 1410. The transceiver 1410 may be, for example, a wireless transceiver. The transceiver 1410 provides a means for communicating with various other apparatus over a transmission medium (e.g., air interface). The transceiver 1410 may further be coupled to one or more antennas/antenna arrays (not shown). The bus interface 1408 further provides an interface between the bus 1402 and a user interface 1412 (e.g., keypad, display, touch screen, speaker, microphone, control features, etc.). Of course, such a user interface 1412 may be omitted in some examples.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. In some examples, the computer-readable medium 1406 may be part of the memory 1405. Those skilled in the art will recognize how best to implement the described functionality presented throughout this disclosure depending on the particular application and the overall design constraints imposed on the overall system. In some examples, the computer-readable medium 1406 may be implemented on an article of manufacture, which may further include one or more other elements or circuits, such as the processor 1404 and/or memory 1405.

The computer-readable medium 1406 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1404, may be responsible for managing the bus 1402 and general processing, including the execution of the software (e.g., instructions or computer-executable code) stored on the computer-readable medium 1406. The software, when executed by the processor 1404, causes the processing system 1414 to perform the various processes and functions described herein for any particular apparatus. The computer-readable medium 1406 and/or the memory 1405 may also be used for storing data that may be manipulated by the processor 1404 when executing software. For example, the memory 1405 may store one or more of a TCI state update list 1416, SFN configurations (e.g., SFN configs) 1418 of component carriers (e.g., cells), and a TCI state activation message 1420.

In some aspects of the disclosure, the processor 1404 may include circuitry configured for various functions. For example, the processor 1404 may include communication and processing circuitry 1442 configured to communicate with a base station (e.g., a gNB or eNB). In some examples, the communication and processing circuitry 1442 may be configured to communicate with the base station via two or more TRPs (e.g., within a SFN, such as a HST-SFN). In some examples, the communication and processing circuitry 1442 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1442 may include one or more transmit/receive chains.

In some implementations where the communication involves receiving information, the communication and processing circuitry 1442 may obtain information from a component of the UE 1400 (e.g., from the transceiver 1410 that receives the information via radio frequency signaling or some other type of signaling suitable for the applicable communication medium), process (e.g., decode) the information, and output the processed information. For example, the communication and processing circuitry 1442 may output the information to another component of the processor 1404, to the memory 1405, or to the bus interface 1408. In some examples, the communication and processing circuitry 1442 may receive one or more of signals, messages, other information, or any combination thereof. In some examples, the communication and processing circuitry 1442 may receive information via one or more channels. In some examples, the communication and processing circuitry 1442 may include functionality for a means for receiving. In some examples, the communication and processing circuitry 1442 may include functionality for a means for processing, including a means for demodulating, a means for decoding, etc.

In some implementations where the communication involves sending (e.g., transmitting) information, the communication and processing circuitry 1442 may obtain information (e.g., from another component of the processor 1404, the memory 1405, or the bus interface 1408), process (e.g., modulate, encode, etc.) the information, and output the processed information. For example, the communication and processing circuitry 1442 may output the information to the transceiver 1410 (e.g., that transmits the information via radio frequency signaling or some other type of signaling suitable for the applicable communication medium). In some examples, the communication and processing circuitry 1442 may send one or more of signals, messages, other information, or any combination thereof. In some examples, the communication and processing circuitry 1442 may send information via one or more channels. In some examples, the communication and processing circuitry 1442 may include functionality for a means for sending (e.g., a means for transmitting). In some examples, the communication and processing circuitry 1442 may include functionality for a means for generating, including a means for modulating, a means for encoding, etc.

In some examples, the communication and processing circuitry 1442 may be configured to receive the TCI state update list 1416 including a plurality of component carriers from a base station and to store the TCI state update list 1416 within, for example, memory 1405. For example, the communication and processing circuitry 1442 may be configured to receive an RRC message including the TCI state update list 1416 from the base station via the transceiver 1410. In some examples, the communication and processing circuitry 1442 may further be configured to receive a respective SFN configuration 1418 of each of the plurality of component carriers and store the SFN configurations 1418 within, for example, memory 1405. For example, the communication and processing circuitry 1442 may be configured to receive an RRC message including the SFN configurations 1418 from the base station via the transceiver 1410.

The communication and processing circuitry 1442 may further be configured to receive the TCI state activation message 1420 from the base station. The TCI state activation message 1420 can include a first TCI state, a second TCI state, a serving cell ID, and a CORESET ID. In some examples, the TCI state activation message 1420 may further include a reserved field. In some examples, the TCI state activation message 1420 may further include a third TCI state for the CORESET ID. In some examples, the TCI state activation message is a MAC-CE, such as a PDCCH MAC-CE, received from the base station via the transceiver 1410. In some examples, the first TCI state is associated with a first TRP and the second TCI state is associated with a second TRP in a SFN. In some examples, the first TRP may be a Doppler anchor TRP in an HST-SFN. The communication and processing circuitry 1442 may further be configured to execute communication and processing software 1452 stored on the computer-readable medium 1406 to implement one or more functions described herein.

The processor 1404 may further include TCI state activation circuitry 1444, configured to activate at least one of the first TCI state or the second TCI state included in the TCI state activation message 1420 for the CORESET identified by the CORESET ID in the serving cell identified by the serving cell ID. The TCI state activation circuitry 1444 may further be configured to activate at least one of the first or second TCI states for the CORESET ID associated with each of the plurality of component carriers in the TCI state update list 1416 in response to the serving cell ID being within the TCI state update list 1416 and further based on the respective SFN configuration 1418 of each of the plurality of component carriers.

In some examples, the TCI state activation circuitry 1444 may be configured to activate both the first TCI state and the second TCI state for the CORESET ID associated with each of the plurality of component carriers. In some examples, the respective SFN configuration 1418 of each of the plurality of component carriers in the TCI state update list 1416 may indicate that each of the plurality of component carriers supports an SFN operation for the CORESET ID. As an example, the TCI state update list 1416 may be configured to prohibit inclusion of other component carriers that do not support the SFN operation for the CORESET ID. In other examples, the respective SFN configuration 1418 of at least one component carrier (e.g., the component carrier of the serving cell ID) in the TCI state update list 1416 may indicate that the at least one component carrier supports the SFN operation for the CORESET ID.

In other examples, the TCI state activation circuitry 1444 may be configured to activate only one of the first TCI state or the second TCI state for the CORESET ID associated with each of the plurality of component carriers in the TCI state update list 1416. In some examples, the TCI state activation circuitry 1444 may be configured to activate only one of the first TCI state or the second TCI state in response to the respective SFN configuration 1418 of each of the plurality of component carriers in the TCI state update list 1416 indicating that not all of the plurality of component carriers support an SFN operation for the CORESET ID. For example, the respective SFN configuration 1418 of each of the plurality of component carriers may indicate that none of the component carriers in the TCI state update list support the SFN operation for the CORESET ID. In this example, the TCI state activation circuitry 1444 may activate the first TCI state listed in the TCI state activation message 1420 for all of the component carriers in the TCI state update list 1416. In other examples, the reserved field in the TCI state activation message 1420 may indicate activation of either the first TCI state or the second TCI state for all of the component carriers in the TCI state update list 1416.

In other examples, the TCI state activation circuitry 1444 may be configured to identify a first set of the plurality of component carriers in the TCI state update list 1416 for which the respective SFN configurations 1418 indicate that an SFN operation is supported for the CORESET ID. The TCI state activation circuitry 1444 may further be configured to identify a second set of the plurality of component carriers in the TCI state update list 1416 for which the respective SFN configurations 1418 indicate that the SFN operation is not supported for the CORESET ID. The TCI state activation circuitry 1444 may then be configured to activate both the first TCI state and the second TCI state for the CORESET ID associated with each of the first set of the plurality of component carriers. In addition, the TCI state activation circuitry 1444 may further be configured to activate only one of the first TCI state or the second TCI state for the CORESET ID associated with each of the second set of the plurality of component carriers. In some examples, the TCI state activation circuitry 1444 may activate the first TCI state listed in the TCI state activation message 1420 for all of the component carriers in the second set of the plurality of component carriers. In other examples, the reserved field in the TCI state activation message 1420 may indicate activation of either the first TCI state or the second TCI state for all of the component carriers in the second set of the plurality of component carriers.

In examples in which the TCI state activation message 1420 includes a third TCI state for the CORESET ID and the serving cell ID, the TCI state activation circuitry 1444 may be configured to activate both the second TCI state and the third TCI state for the CORESET ID or only the first TCI state for the CORESET ID associated with each of the plurality of component carriers included in the TCI state update list 1416. For example, the TCI state activation circuitry 1444 may be configured to activate both the second TCI state and the third TCI state in response to the SFN configuration 1418 of the serving cell indicating that the serving cell supports an SFN operation for the CORESET ID. As another example, the TCI state activation circuitry 1444 may be configured to activate the first TCI state in response to the SFN configuration 1418 of the serving cell indicating that the serving cell does not support the SFN operation for the CORESET ID.

In other examples in which the TCI state activation message 1420 includes a third TCI state, the TCI state activation circuitry 1444 may be configured to identify a first set of the plurality of component carriers in the TCI state update list 1416 for which the respective SFN configurations 1418 indicate that an SFN operation is supported for the CORESET ID. The TCI state activation circuitry 1444 may further be configured to identify a second set of the plurality of component carriers in the TCI state update list 1416 for which the respective SFN configurations 1418 indicate that the SFN operation is not supported for the CORESET ID. The TCI state activation circuitry 1444 may then be configured to activate both the second TCI state and the third TCI state for the CORESET ID associated with the first set of the plurality of component carriers and to activate the first TCI state for the CORESET ID associated with the second set of the plurality of component carriers.

In some examples, the TCI state activation circuitry 1444 may be configured to activate either the first TCI state or both the first TCI state and the second TCI state included in the TCI state activation message 1420 for each of the plurality of component carriers included in the TCI state update list 1416. In this example, the reserved field in the TCI state activation message 1420 may indicate activation of either the first TCI state or both the first and second TCI states for each of the plurality of component carriers. As a result, the TCI state activation message 1420 may always include two TCI states (or at least two TCI states) for both SFN and non-SFN operation, and the value of the reserved field indicates whether SFN or non-SFN is to be applied to the component carriers. The TCI state activation circuitry 1444 may further be configured to execute TCI state activation software 1454 stored on the computer-readable medium 1406 to implement one or more functions described herein.

Figure 15:
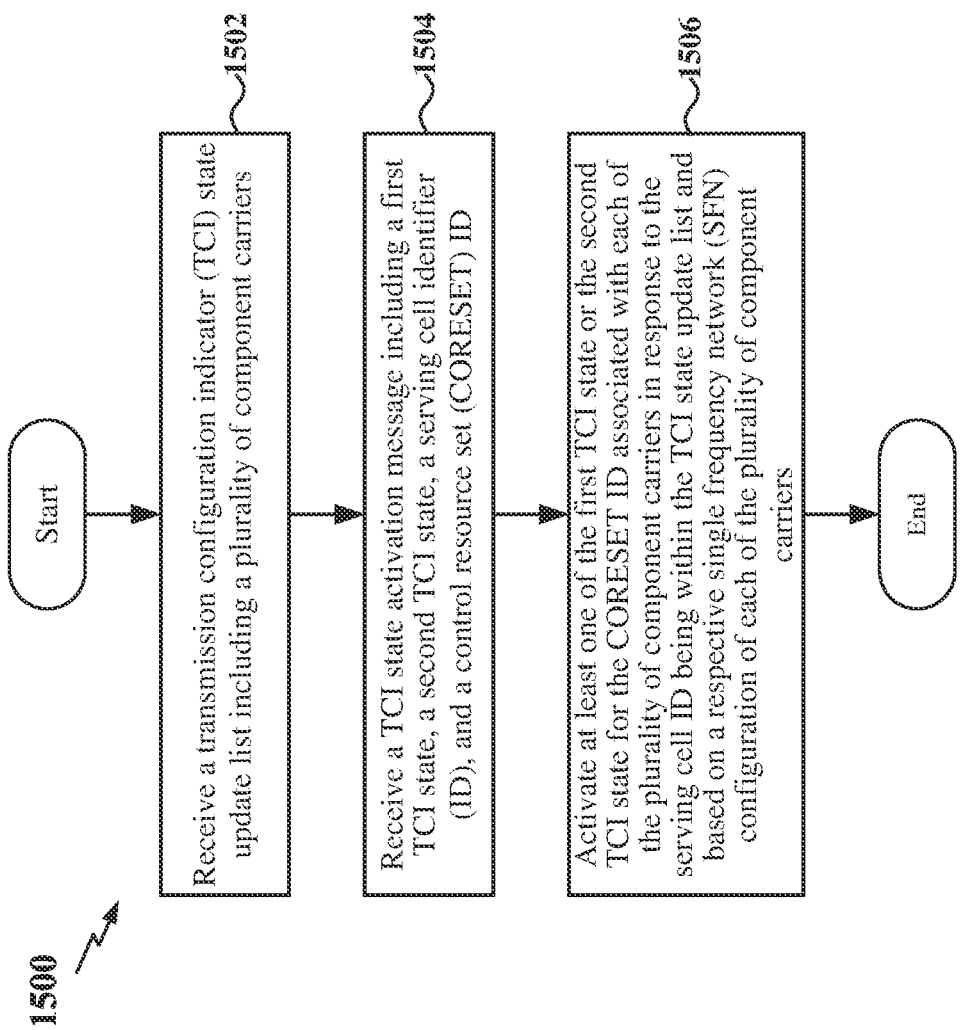
FIG. 15 is a flow chart illustrating an exemplary method of SFN TCI state activation based on a TCI state update list according to some aspects.

FIG. 15 is a flow chart illustrating an exemplary method 1500 of SFN TCI state activation based on a TCI state update list according to some aspects. In some examples, the method 1500 may be utilized in a single frequency network (SFN). In some examples, the method 1500 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 1500 may be performed by the UE 1400, as described herein and illustrated in FIG. 14, by a processor or processing system, or by any suitable means for carrying out the described functions.

At block 1502, the UE may receive a transmission configuration indicator (TCI) state update list including a plurality of component carriers. For example, the communication and processing circuitry 1442 together with the transceiver 1410, shown and described above in connection with FIG. 14, may provide a means for receiving the TCI state update list.

At block 1504, the UE may receive a TCI state activation message including a first TCI state, a second TCI state, a serving cell identifier (ID), and a control resource set (CORESET) ID. In some examples, the TCI state activation message is a medium access control (MAC) control element (MAC-CE). In some examples, the first TCI state is associated with a first transmission and reception point (TRP) and the second TCI state is associated with a second TRP, where the first TRP is a Doppler anchor TRP. For example, the communication and processing circuitry 1442 together with the transceiver 1410, shown and described above in connection with FIG. 14, may provide a means for receiving the TCI state activation message.

At block 1506, the UE may activate at least one of the first TCI state or the second TCI state for the CORESET ID associated with each of the plurality of component carriers in response to the serving cell ID being within the TCI state update list and based on a respective single frequency network (SFN) configuration of each of the plurality of component carriers. In some examples, the UE may activate both the first TCI state and the second TCI state for the CORESET ID associated with each of the plurality of component carriers. In some examples, the respective SFN configuration of each of the plurality of component carriers indicates that each of the plurality of component carriers supports an SFN operation for the CORESET ID. In some examples, the TCI state update list is configured to prohibit inclusion of other component carriers that do not support SFN operation for the CORESET ID. In some examples, the respective SFN configuration of at least one component carrier of the plurality of component carriers indicates that the at least one component carrier supports an SFN operation for the CORESET ID.

In some examples, the UE may activate only one of the first TCI state or the second TCI state for the CORESET ID associated with each of the plurality of component carriers in response to the respective SFN configuration of each of the plurality of component carriers indicating that not all of the plurality of component carriers support an SFN operation for the CORESET ID. In some examples, the TCI state activation message further includes a reserved field indicating activation of the first TCI state or the second TCI state for the plurality of component carriers. In some examples, the UE may activate both the first TCI state and the second TCI state for the CORESET ID associated with a first set of the plurality of component carriers for which the respective SFN configuration indicates that an SFN operation is supported for the CORESET ID. In addition, the UE may activate only one of the first TCI state or the second TCI state for the CORESET ID associated with a second set of the plurality of component carriers for which the respective SFN configuration indicates that SFN operation is not supported for the CORESET ID. In some examples, the TCI state activation message further includes a reserved field indicating activation of the first TCI state or the second TCI state for the second set of the plurality of component carriers.

In some examples, the TCI state activation message includes a third TCI state for the CORESET ID. In some examples, the UE may activate either both the second TCI state and the third TCI state for the CORESET ID associated with each of the plurality of component carriers in response to the SFN configuration of the serving cell indicating that the serving cell supports an SFN operation for the CORESET ID or the first TCI state for the CORESET ID associated with each of the plurality of component carriers in response to the SFN configuration of the serving cell indicating that the serving cell does not support the SFN operation for the CORESET ID. In some examples, the UE may activate both the second TCI state and the third TCI state for the CORESET ID associated with a first set of the plurality of component carriers for which the respective SFN configuration indicates that an SFN operation is supported for the CORESET ID. In addition, the UE may activate the first TCI state for the CORESET ID associated with a second set of the plurality of component carriers for which the respective SFN configuration indicates that SFN operation is not supported for the CORESET ID.

In some examples, the TCI state activation message further includes a reserved field indicating activation of either the first TCI state or both the first TCI state and the second TCI state for each of the plurality of component carriers. For example, the TCI state activation circuitry 1444 shown and described above in connection with FIG. 14 may provide the means for activating at least one of the first TCI state or the second TCI state.

Figure 16:
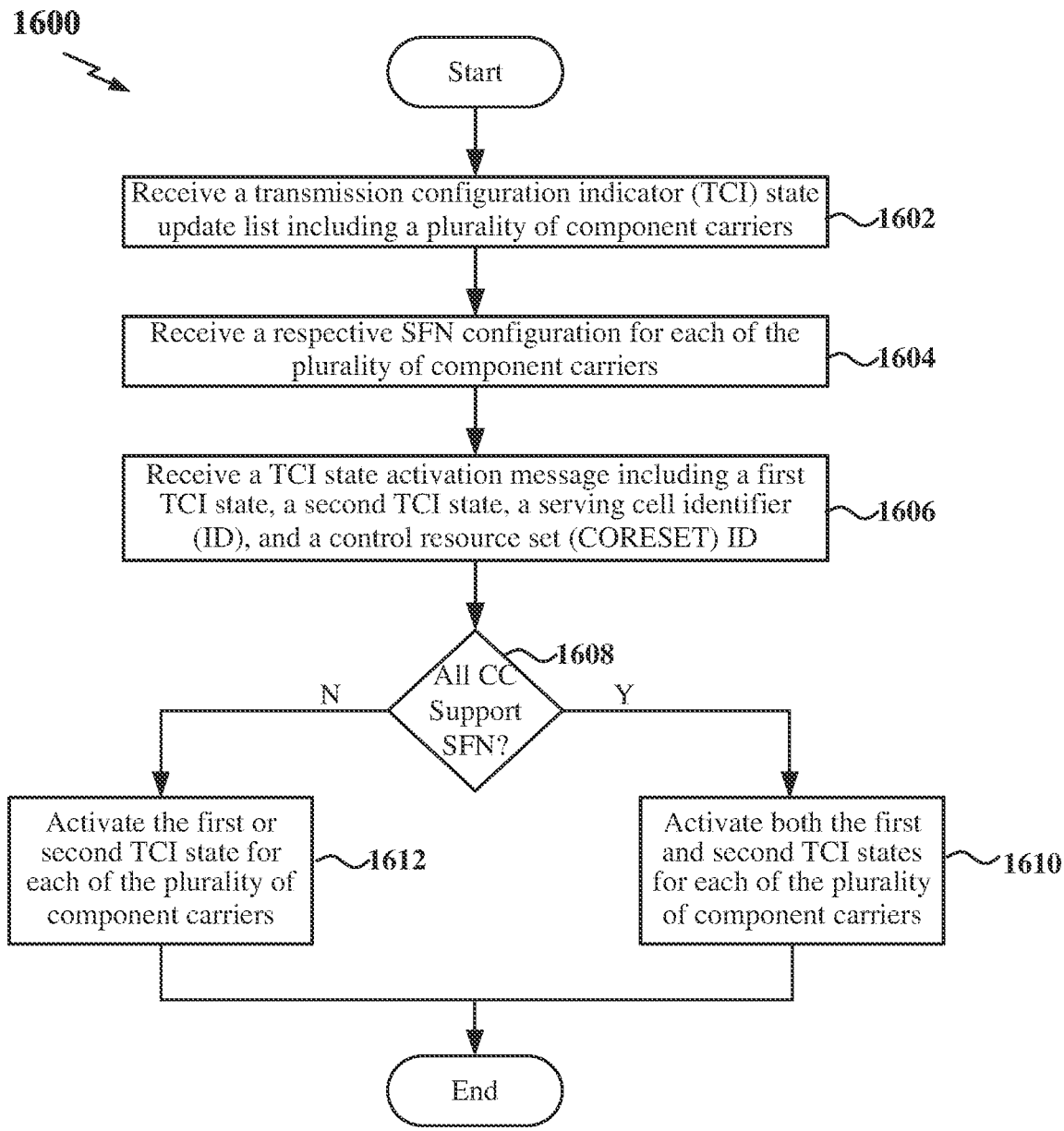
FIG. 16 is a flow chart illustrating another exemplary method of SFN TCI state activation according to some aspects.

FIG. 16 is a flow chart illustrating another exemplary method 1600 of SFN TCI state activation based on a TCI state update list according to some aspects. In some examples, the method 1600 may be utilized in a single frequency network (SFN). In some examples, the method 1600 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 1600 may be performed by the UE 1400, as described herein and illustrated in FIG. 14, by a processor or processing system, or by any suitable means for carrying out the described functions.

At block 1602, the UE may receive a transmission configuration indicator (TCI) state update list including a plurality of component carriers. For example, the communication and processing circuitry 1442 together with the transceiver 1410, shown and described above in connection with FIG. 14, may provide a means for receiving the TCI state update list.

At block 1604, the UE may receive a respective SFN configuration for each of the plurality of component carriers in the TCI state update list. In some examples, the UE may receive a RRC message including the SFN configurations. For example, the communication and processing circuitry 1442 together with the transceiver 1410, shown and described above in connection with FIG. 14, may provide a means for receiving the SFN configurations.

At block 1606, the UE may receive a TCI state activation message including a first TCI state, a second TCI state, a serving cell identifier (ID), and a control resource set (CORESET) ID. In some examples, the TCI state activation message is a medium access control (MAC) control element (MAC-CE). In some examples, the first TCI state is associated with a first transmission and reception point (TRP) and the second TCI state is associated with a second TRP, where the first TRP is a Doppler anchor TRP. For example, the communication and processing circuitry 1442 together with the transceiver 1410, shown and described above in connection with FIG. 14, may provide a means for receiving the TCI state activation message.

At block 1608, the UE may determine whether all of the component carriers in the TCI state update list support SFN operation for the CORESET ID. In some examples, the TCI state update list is configured to prohibit inclusion of other component carriers that do not support SFN operation for the CORESET ID. For example, the TCI state activation circuitry 1444 shown and described above in connection with FIG. 14 may provide the means for determining whether the component carriers support SFN operation.

If all of the component carriers in the TCI state update list support the SFN operation for the CORESET ID (Y branch of block 1608), at block 1610, the UE may activate both the first TCI state and the second TCI state for the CORESET ID associated with each of the plurality of component carriers. For example, the TCI state activation circuitry 1444 shown and described above in connection with FIG. 14 may provide the means for activating both of the first TCI state and the second TCI state for each of the plurality of component carriers.

If not all of the component carriers in the TCI state update list support the SFN operation for the CORESET ID (N branch of block 1608), at block 1612, the UE may activate only one of the first TCI state or the second TCI state for the CORESET associated with each of the plurality of component carriers. In some examples, the TCI state activation message further includes a reserved field indicating activation of the first TCI state or the second TCI state for the plurality of component carriers. For example, the TCI state activation circuitry 1444 shown and described above in connection with FIG. 14 may provide the means for activating only one of the first TCI state or the second TCI state for each of the plurality of component carriers.

Figure 17:
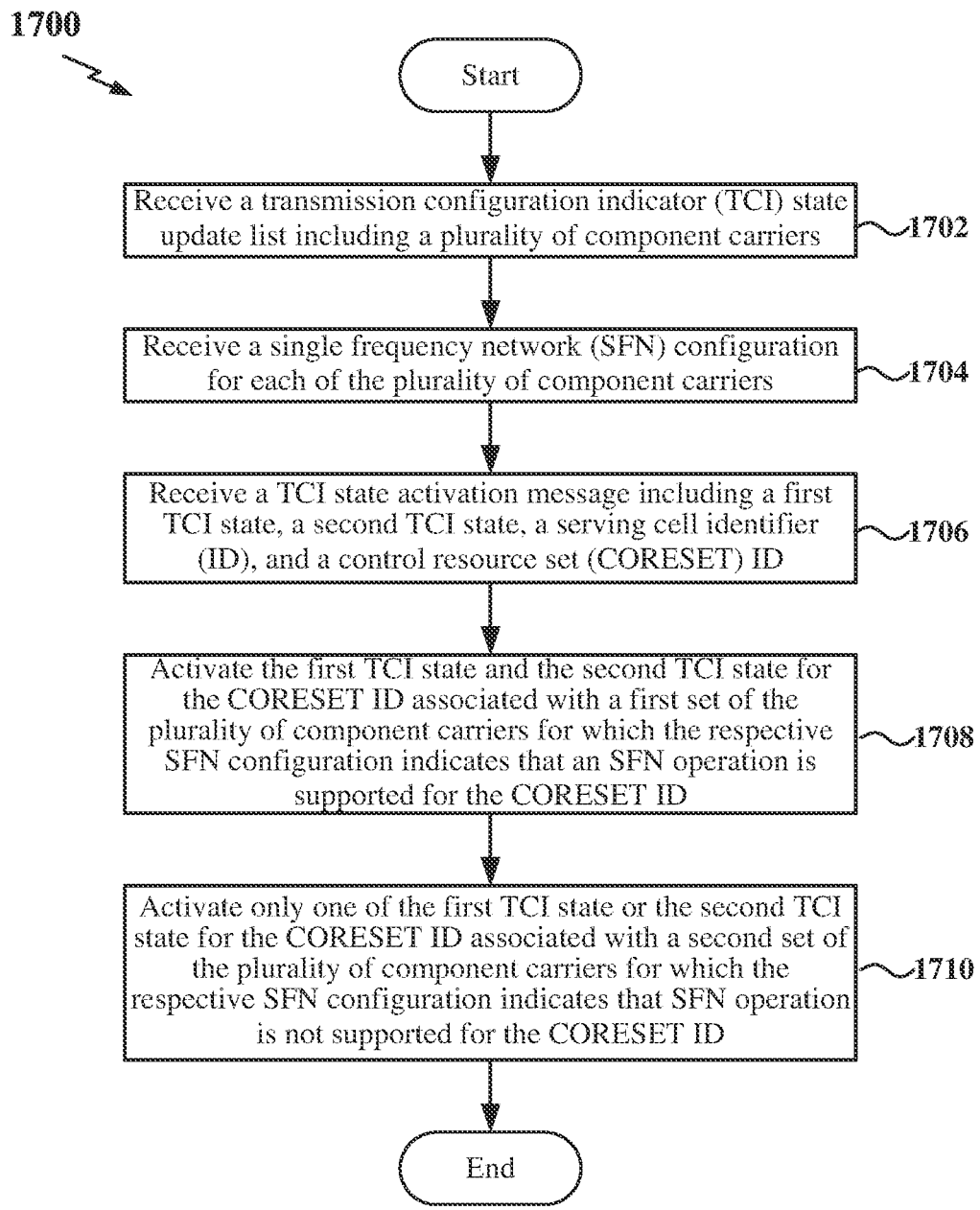
FIG. 17 is a flow chart illustrating another exemplary method of SFN TCI state activation according to some aspects.

FIG. 17 is a flow chart illustrating another exemplary method 1700 of SFN TCI state activation based on a TCI state update list according to some aspects. In some examples, the method 1700 may be utilized in a single frequency network (SFN). In some examples, the method 1700 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 1700 may be performed by the UE 1400, as described herein and illustrated in FIG. 14, by a processor or processing system, or by any suitable means for carrying out the described functions.

At block 1702, the UE may receive a transmission configuration indicator (TCI) state update list including a plurality of component carriers. For example, the communication and processing circuitry 1442 together with the transceiver 1410, shown and described above in connection with FIG. 14, may provide a means for receiving the TCI state update list.

At block 1704, the UE, may receive a respective SFN configuration for each of the plurality of component carriers in the TCI state update list. In some examples, the UE may receive a RRC message including the SFN configurations. For example, the communication and processing circuitry 1442 together with the transceiver 1410, shown and described above in connection with FIG. 14, may provide a means for receiving the SFN configurations.

At block 1706, the UE may receive a TCI state activation message including a first TCI state, a second TCI state, a serving cell identifier (ID), and a control resource set (CORESET) ID. In some examples, the TCI state activation message is a medium access control (MAC) control element (MAC-CE). In some examples, the first TCI state is associated with a first transmission and reception point (TRP) and the second TCI state is associated with a second TRP, where the first TRP is a Doppler anchor TRP. For example, the communication and processing circuitry 1442 together with the transceiver 1410, shown and described above in connection with FIG. 14, may provide a means for receiving the TCI state activation message.

At block 1708, the UE may activate the first TCI state and the second TCI state for the CORESET ID associated with a first set of the plurality of component carriers for which the respective SFN configuration indicates that an SFN operation is supported for the CORESET ID. For example, the TCI state activation circuitry 1444 shown and described above in connection with FIG. 14 may provide the means for activating both the first TCI state and the second TCI state for the CORESET ID associated with the first set of the plurality of component carriers.

At block 1710, the UE may further activate only one of the first TCI state or the second TCI state for the CORESET ID associated with a second set of the plurality of component carriers for which the respective SFN configuration indicates that SFN operation is not supported for the CORESET ID. In some examples, the TCI state activation message further includes a reserved field indicating activation of the first TCI state or the second TCI state for the second set of the plurality of component carriers. For example, the TCI state activation circuitry 1444 shown and described above in connection with FIG. 14 may provide the means for activating only one of the first TCI state or the second TCI state for the second set of the plurality of component carriers.

Figure 18:
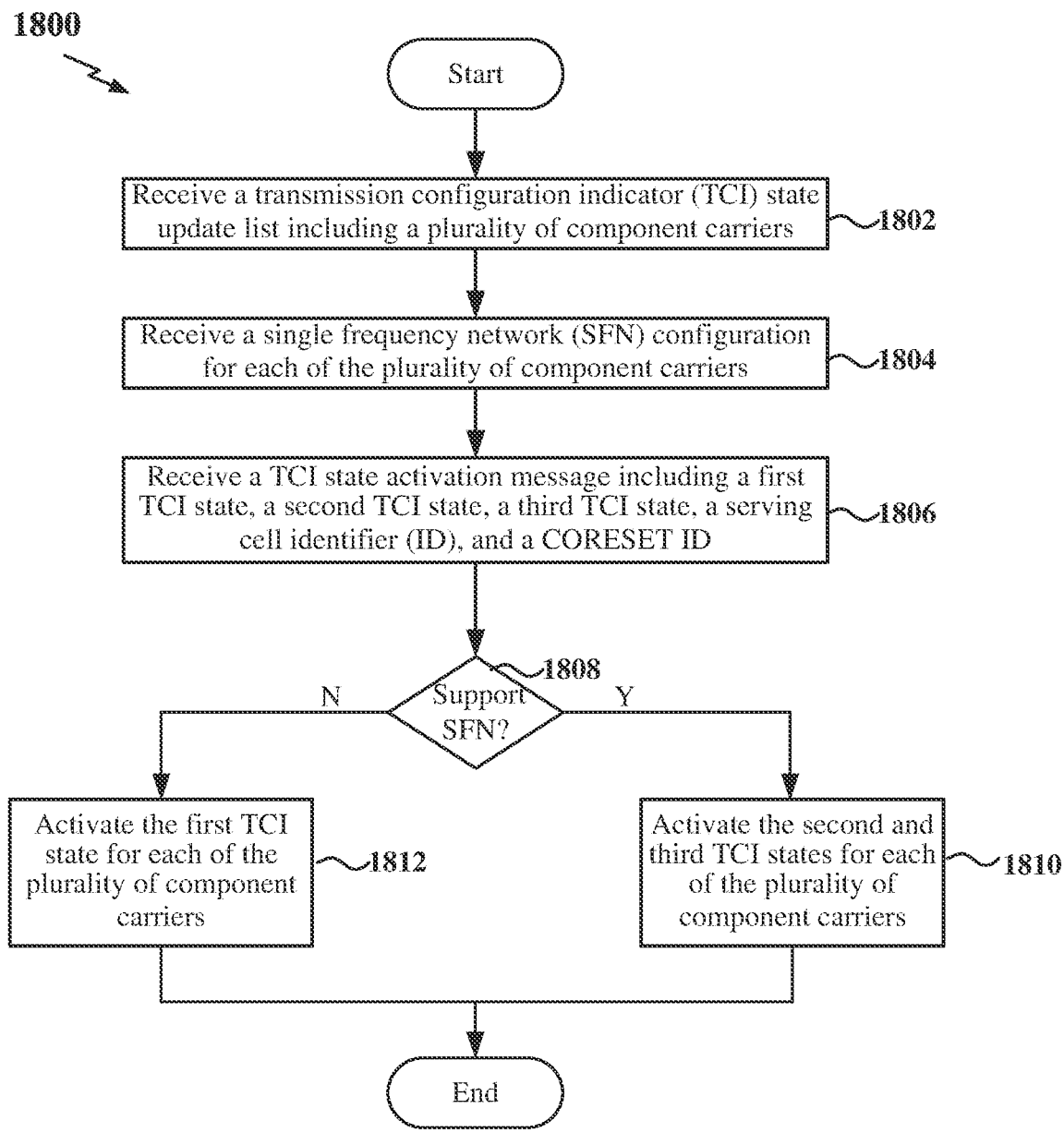
FIG. 18 is a flow chart illustrating an exemplary method of SFN and/or non-SFN TCI state activation according to some aspects.

FIG. 18 is a flow chart illustrating an exemplary method 1800 of SFN and/or non-SFN TCI state activation according to some aspects. In some examples, the method 1800 may be utilized in a single frequency network (SFN). In some examples, the method 1800 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 1800 may be performed by the UE 1400, as described herein and illustrated in FIG. 14, by a processor or processing system, or by any suitable means for carrying out the described functions.

At block 1802, the UE may receive a transmission configuration indicator (TCI) state update list including a plurality of component carriers. For example, the communication and processing circuitry 1442 together with the transceiver 1410, shown and described above in connection with FIG. 14, may provide a means for receiving the TCI state update list.

At block 1804, the UE may receive a respective SFN configuration for each of the plurality of component carriers in the TCI state update list. In some examples, the UE may receive a RRC message including the SFN configurations. For example, the communication and processing circuitry 1442 together with the transceiver 1410, shown and described above in connection with FIG. 14, may provide a means for receiving the SFN configurations.

At block 1806, the UE may receive a TCI state activation message including a first TCI state, a second TCI state, a third TCI state, a serving cell identifier (ID), and a control resource set (CORESET) ID. In some examples, the TCI state activation message is a medium access control (MAC) control element (MAC-CE). For example, the communication and processing circuitry 1442 together with the transceiver 1410, shown and described above in connection with FIG. 14, may provide a means for receiving the TCI state activation message.

At block 1808, the UE may determine whether a serving cell identified by the serving cell ID supports an SFN operation for the CORESET ID based on the SFN configuration. For example, the TCI state activation circuitry 1444 shown and described above in connection with FIG. 14 may provide the means for determining whether the serving cell supports the SFN operation.

If the serving cell supports the SFN operation (Y branch of block 1808), at block 1810, the UE may activate the second and third TCI states for the CORESET ID associated with each of the plurality of component carriers. For example, the TCI state activation circuitry 1444 shown and described above in connection with FIG. 14 may provide the means for activating the second TCI state and the third TCI state for the CORESET ID associated with each of the plurality of component carriers.

If the serving cell does not support the SFN operation (N branch of block 1808), at block 1812, the UE may activate the first TCI state for the CORESET ID associated with each of the plurality of component carriers. For example, the TCI state activation circuitry 1444 shown and described above in connection with FIG. 14 may provide the means for activating the first TCI state for the CORESET ID associated with each of the plurality of component carriers.

Figure 19:
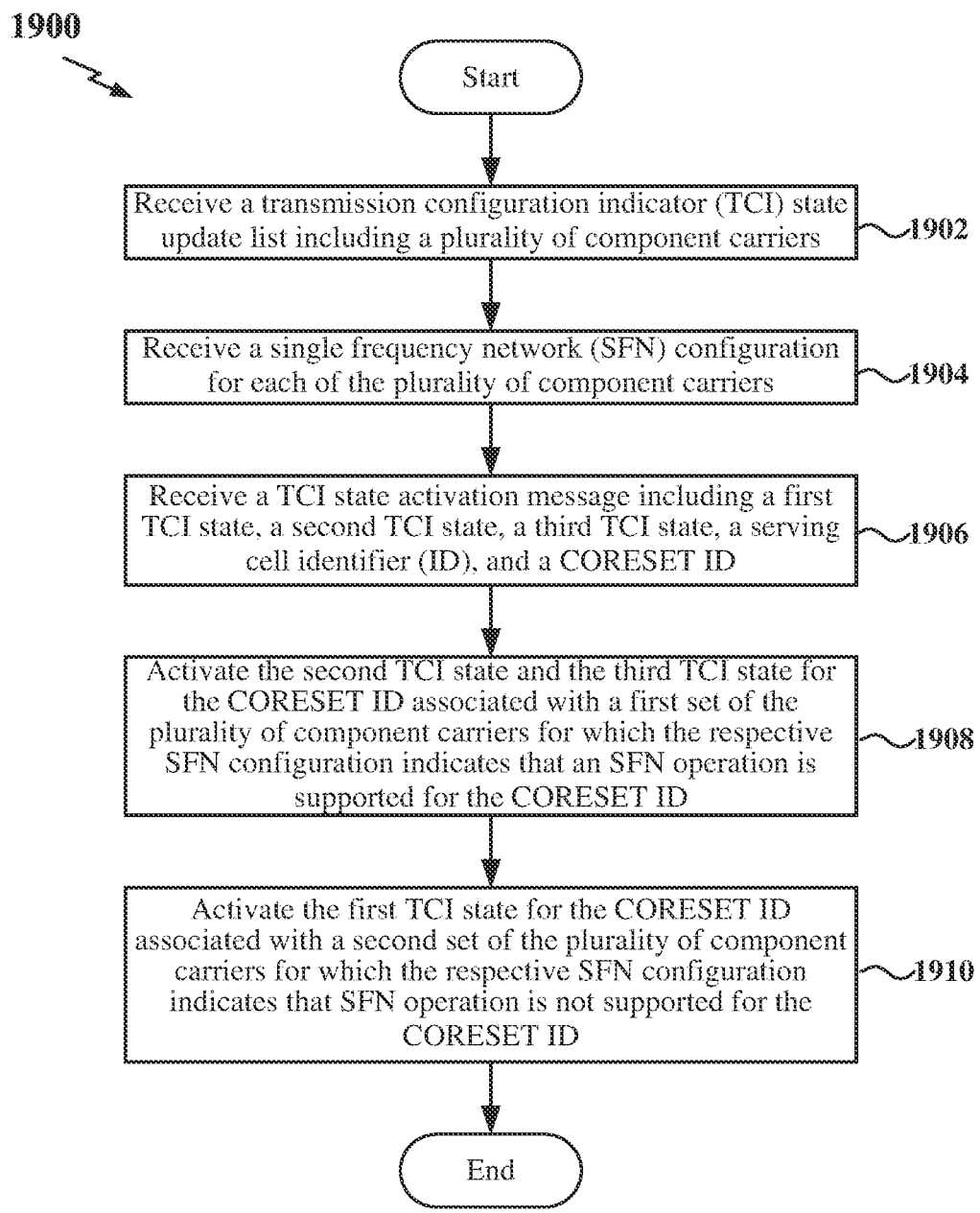
FIG. 19 is a flow chart illustrating another exemplary method of SFN and/or non-SFN TCI state activation according to some aspects.

FIG. 19 is a flow chart illustrating another exemplary method 1900 of SFN and/or non-SFN TCI state activation according to some aspects. In some examples, the method 1900 may be utilized in a single frequency network (SFN). In some examples, the method 1900 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 1900 may be performed by the UE 1400, as described herein and illustrated in FIG. 14, by a processor or processing system, or by any suitable means for carrying out the described functions.

At block 1902, the UE may receive a transmission configuration indicator (TCI) state update list including a plurality of component carriers. For example, the communication and processing circuitry 1442 together with the transceiver 1410, shown and described above in connection with FIG. 14, may provide a means for receiving the TCI state update list.

At block 1904, the UE may receive a respective SFN configuration for each of the plurality of component carriers in the TCI state update list. In some examples, the UE may receive a RRC message including the SFN configurations. For example, the communication and processing circuitry 1442 together with the transceiver 1410, shown and described above in connection with FIG. 14, may provide a means for receiving the SFN configurations.

At block 1906, the UE may receive a TCI state activation message including a first TCI state, a second TCI state, a third TCI state, a serving cell identifier (ID), and a control resource set (CORESET) ID. In some examples, the TCI state activation message is a medium access control (MAC) control element (MAC-CE). For example, the communication and processing circuitry 1442 together with the transceiver 1410, shown and described above in connection with FIG. 14, may provide a means for receiving the TCI state activation message.

At block 1908, the UE may activate the second TCI state and the third TCI state for the CORESET ID associated with a first set of the plurality of component carriers for which the respective SFN configuration indicates that an SFN operation is supported for the CORESET ID. For example, the TCI state activation circuitry 1444 shown and described above in connection with FIG. 14 may provide the means for activating both the second TCI state and the third TCI state for the CORESET ID associated with the first set of the plurality of component carriers.

At block 1910, the UE may further activate the first TCI state for the CORESET ID associated with a second set of the plurality of component carriers for which the respective SFN configuration indicates that SFN operation is not supported for the CORESET ID. For example, the TCI state activation circuitry 1444 shown and described above in connection with FIG. 14 may provide the means for activating the first TCI state for the second set of the plurality of component carriers.

In one configuration, the UE 1400 includes means for receiving a transmission configuration indicator (TCI) state update list including a plurality of component carriers and means for receiving a TCI state activation message including a first TCI state, a second TCI state, a serving cell identifier (ID), and a control resource set (CORESET) ID. The UE 1400 further includes means for activating at least one of the first TCI state or the second TCI state for the CORESET ID associated with each of the plurality of component carriers in response to the serving cell ID being within the TCI state update list and based on a respective single frequency network (SFN) configuration of each of the plurality of component carriers. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 5, 6, and/or 10, and utilizing, for example, the processes and/or algorithms described herein in relation to FIGS. 12 and 15-19.

Figure 20:
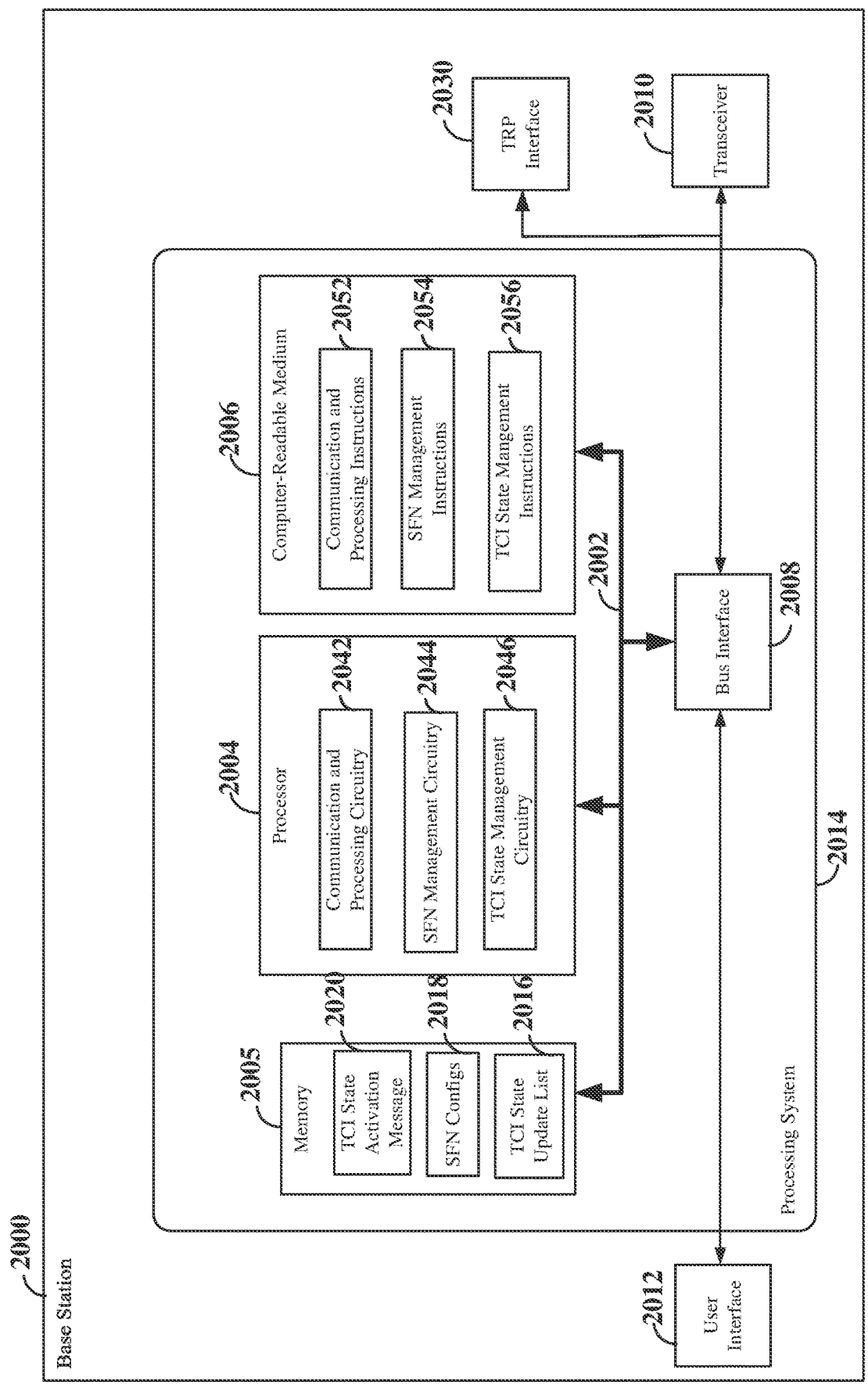
FIG. 20 is a block diagram illustrating an example of a hardware implementation of a base station employing a processing system according to some aspects.

FIG. 20 is a block diagram illustrating an example of a hardware implementation of a base station 2000 employing a processing system 2014 according to some aspects. The base station 2000 may be, for example, any base station (e.g., gNB, eNB) or other scheduling entity as illustrated in any one or more of FIGS. 1, 2, 5, 6, 10, and/or 12.

In accordance with various aspects of the disclosure, an element, or any portion of an element, or any combination of elements may be implemented with a processing system 2014 that includes one or more processors, such as processor 2004. The processing system 2014 may be substantially the same as the processing system 1414 as shown and described above in connection with FIG. 14, including a bus interface 2008, a bus 2002, a memory 2005, a processor 2004, and a computer-readable medium 2006. Furthermore, the base station 2000 may include an optional user interface 2012 and a transceiver 2010, substantially similar to those described above in FIG. 14. Accordingly, their descriptions will not be repeated for the sake of brevity. In some examples, the bus interface 2008 may further provide an interface between the bus 2002 and a transmit receive point (TRP) interface 2030. The TRP interface 2030 may provide an interface (e.g., wireless or wired) between the base station 2000 and a plurality of TRPs. In some examples, the TRP interface 2030 may be the transceiver 2010.

The processor 2004, as utilized in the base station 2000, may be used to implement any one or more of the processes described below. In some examples, the memory 2005 may store a TCI state update list 2016, SFN configurations (e.g., SFN configs) 2018 of component carriers (e.g., cells), and a TCI state activation message 2020 generated by the base station 2000.

In some aspects of the disclosure, the processor 2004 may include communication and processing circuitry 2042 configured for various functions, including, for example, communicating with one or more UEs or other scheduled entities, or a core network node. In some examples, the communication and processing circuitry 2042 may communicate with one or more UEs via one or more TRPs associated with the base station 2000. In some examples, the communication and processing circuitry 2042 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 2042 may be configured to process and transmit downlink traffic and downlink control and receive and process uplink traffic and uplink control.

In some examples, the communication and processing circuitry 2042 may be configured to transmit the TCI state update list 2016 including a plurality of component carriers to a UE. For example, the communication and processing circuitry 2042 may be configured to transmit an RRC message including the TCI state update list 2016 to the UE via the transceiver 2010. In some examples, the communication and processing circuitry 2042 may further be configured to transmit a respective SFN configuration 2018 of each of the plurality of component carriers. For example, the communication and processing circuitry 2042 may be configured to transmit an RRC message including the SFN configurations 2018 to the UE via the transceiver 2010.

The communication and processing circuitry 2042 may further be configured to transmit the TCI state activation message 2020 to the UE. The TCI state activation message 2020 can include a first TCI state, a second TCI state, a serving cell ID, and a CORESET ID, and may be configured to activate at least one of the first TCI state or the second TCI state on the UE for the CORESET ID associated with each of the plurality of component carriers. In some examples, the TCI state activation message 2020 may further include a reserved field. In some examples, the TCI state activation message 2020 may further include a third TCI state for the CORESET ID. In some examples, the TCI state activation message is a MAC-CE, such as a PDCCH MAC-CE, transmitted to the UE via the transceiver 2010. In some examples, the first TCI state is associated with a first TRP and the second TCI state is associated with a second TRP in an SFN. In some examples, the first TRP may be a Doppler anchor TRP in an HST-SFN. The communication and processing circuitry 2042 may further be configured to execute communication and processing software 2052 stored on the computer-readable medium 2006 to implement one or more functions described herein.

In some aspects of the disclosure, the processor 2004 may include other circuitry configured for various functions. For example, the processor 2004 may include SFN management circuitry 2044, configured to manage an SFN operation, such as an HST-SFN operation. In some examples, the SFN management circuitry 2044 may be configured to generate respective SFN configurations 2018 for each of the plurality of component carriers in the TCI state update list and to store the SFN configurations 2018 within, for example, memory 2005. The SFN management circuitry 2044 may further be configured to execute SFN management software 2054 stored on the computer-readable medium 2006 to implement one or more functions described herein.

The processor 2004 may further include TCI state management circuitry 2046 configured to manage a plurality of TCI states for SFN and/or non-SFN operations. In some examples, the TCI state management circuitry 2046 may be configured to generate the TCI state update list 2016 based on the SFN configurations 2018 and to store the TCI state update list 2016 within, for example, memory 2005. In some examples, the TCI state management circuitry 2046 may further generate the TCI state activation message 2020 based on the TCI state update list 2016 and the SFN configurations 2018.

In some examples, the TCI state management circuitry 2046 may be configured to generate the TCI state activation message to be configured to activate both the first TCI state and the second TCI state on the UE for the CORESET ID associated with each of the plurality of component carriers. For example, the TCI state activation message may be configured to activate both the first TCI state and the second TCI state in response to the respective SFN configuration 2018 of each of the plurality of component carriers indicating that each of the plurality of component carriers supports an SFN operation for the CORESET ID. In some examples, the TCI state management circuitry 2046 may be configured such that the TCI state management circuitry 2046 is prohibited from including other component carriers that do not support the SFN operation for the CORESET ID within the TCI state update list.

In some examples, the TCI state management circuitry 2046 may be configured to generate the TCI state activation message to be configured to activate both the first TCI state and the second TCI state on the UE for the CORESET ID associated with a first set of the plurality of component carriers for which the respective SFN configuration indicates that an SFN operation is supported for the CORESET ID and to activate only one of the first TCI state or the second TCI state on the UE for the CORESET ID associated with a second set of the plurality of component carriers for which the respective SFN configuration indicates that SFN operation is not supported for the CORESET ID. In some examples, the TCI state management circuitry 2046 may further be configured to include a value in the reserved field of the TCI state activation message indicating activation of the first TCI state or the second TCI state for the second set of the plurality of component carriers.

In some examples, the TCI state management circuitry 2046 may be configured to generate the TCI state activation message to be configured to either activate the second TCI state and the third TCI state on the UE for the CORESET ID associated with each of the plurality of component carriers in response to the SFN configuration of the serving cell indicating that the serving cell supports an SFN operation for the CORESET ID or activate the first TCI state for the CORESET ID associated with each of the plurality of component carriers in response to the SFN configuration of the serving cell indicating that the serving cell does not support the SFN operation for the CORESET ID. In some examples, the TCI state management circuitry 2046 may further be configured to include a value in the reserved field of the TCI state activation message indicating activation of either the first TCI state or both the first TCI state and the second TCI state for each of the plurality of component carriers. The TCI state management circuitry 2046 may further be configured to execute TCI state management software 2056 stored on the computer-readable medium 2006 to implement one or more functions described herein.

Figure 21:
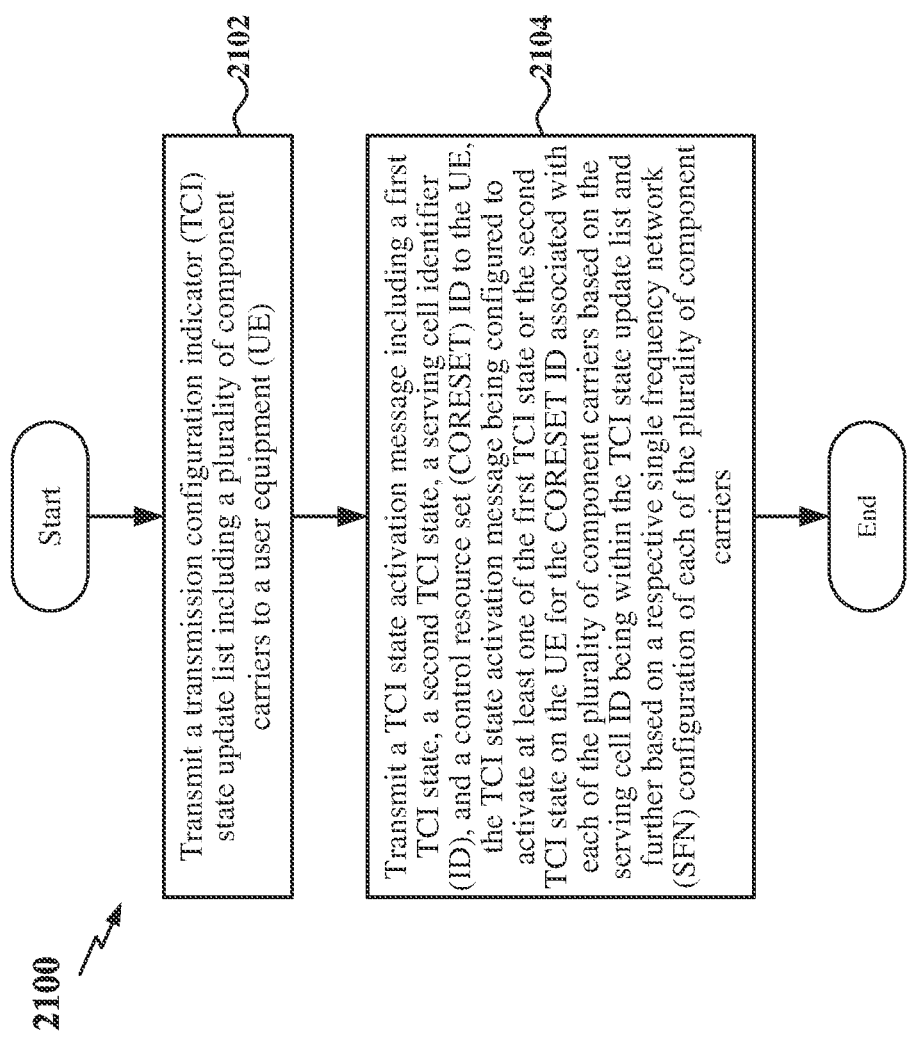
FIG. 21 is a flow chart illustrating an exemplary method of SFN TCI state activation according to some aspects.

FIG. 21 is a flow chart illustrating an exemplary method 2100 of SFN TCI state activation according to some aspects. In some examples, the method 2100 may be utilized in a single frequency network (SFN). In some examples, the method 2100 may be utilized in a high-speed train (HST) single frequency network (HST-SFN). As described below, some or all illustrated features may be omitted in a particular implementation within the scope of the present disclosure, and some illustrated features may not be required for implementation of all aspects. In some examples, the method 2100 may be performed by the base station 2000, as described herein and illustrated in FIG. 20, by a processor or processing system, or by any suitable means for carrying out the described functions.

At block 2102, the base station may transmit a transmission configuration indicator (TCI) state update list including a plurality of component carriers to a user equipment (UE). For example, the communication and processing circuitry 2042 together with the transceiver 2010/TRP interface 2030, shown and described above in connection with FIG. 20, may provide a means for transmitting the TCI state update list.

At block 2104, the base station may transmit a TCI state activation message including a first TCI state, a second TCI state, a serving cell identifier (ID), and a control resource set (CORESET) ID to the UE. The TCI state activation message can be configured to activate at least one of the first TCI state or the second TCI state on the UE for the CORESET ID associated with each of the plurality of component carriers based on the serving cell ID being within the TCI state update list and further based on a respective single frequency network (SFN) configuration of each of the plurality of component carriers. In some examples, the TCI state activation message is a medium access control (MAC) control element (MAC-CE).

In some examples, the TCI state activation message is configured to activate both the first TCI state and the second TCI state on the UE for the CORESET ID associated with each of the plurality of component carriers, in some examples, the first TCI state is associated with a first transmission and reception point (TRP) associated with the base station and the second TCI state is associated with a second TRP associated with the base station, where the first TRP is a Doppler anchor TRP. In some examples, the respective SFN configuration of each of the plurality of component carriers indicates that each of the plurality of component carriers supports an SFN operation for the CORESET ID. In some examples, the base station may prohibit the TCI state update list from including other component carriers that do not support the SFN operation for the CORESET ID.

In some examples, the TCI state activation message is configured to activate both the first TCI state and the second TCI state on the UE for the CORESET ID associated with a first set of the plurality of component carriers for which the respective SFN configuration indicates that an SFN operation is supported for the CORESET ID and activate only one of the first TCI state or the second TCI state on the UE for the CORESET ID associated with a second set of the plurality of component carriers for which the respective SFN configuration indicates that SFN operation is not supported for the CORESET ID. In some examples, the TCI state activation message further includes a reserved field indicating activation of the first TCI state or the second TCI state for the second set of the plurality of component carriers.

In some examples, the TCI state activation message further includes a third TCI state for the CORESET ID. The TCI state activation message may further be configured to either activate the second TCI state and the third TCI state on the UE for the CORESET ID associated with each of the plurality of component carriers in response to the SFN configuration of the serving cell indicating that the serving cell supports an SFN operation for the CORESET ID or activate the first TCI state for the CORESET ID associated with each of the plurality of component carriers in response to the SFN configuration of the serving cell indicating that the serving cell does not support the SFN operation for the CORESET ID.

In some examples, the TCI state activation message further includes a reserved field indicating activation of either the first TCI state or both the first TCI state and the second TCI state for each of the plurality of component carriers. For example, the TCI state management circuitry 2046, together with the SFN management circuitry 2044, communication and processing circuitry 2042 and transceiver 2010/TRP interface 2030, shown and described above in connection with FIG. 20, may provide a means for transmitting the TCI state activation message.

In one configuration, the base station 2000 includes means for transmitting a transmission configuration indicator (TCI) state update list including a plurality of component carriers to a user equipment (UE) and means for transmitting a TCI state activation message including a first TCI state, a second TCI state, a serving cell identifier (ID), and a control resource set (CORESET) ID to the UE. The TCI state activation message is configured to activate at least one of the first TCI state or the second TCI state on the UE for the CORESET ID associated with each of the plurality of component carriers based on the serving cell ID being within the TCI state update list and further based on a respective single frequency network (SFN) configuration of each of the plurality of component carriers. In one aspect, the aforementioned means may be the processor 2004 shown in FIG. 20 configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. 1, 2, 5, 6, and/or 10, and utilizing, for example, the processes and/or algorithms described herein in relation to FIGS. 12 and 21.

The following provides an overview of aspects of the present disclosure:

Aspect 1: A method for wireless communication at a user equipment (UE), the method comprising: receiving a transmission configuration indicator (TCI) state update list comprising a plurality of component carriers; receiving a TCI state activation message comprising a first TCI state, a second TCI state, a serving cell identifier (ID), and a control resource set (CORESET) ID; and activating at least one of the first TCI state or the second TCI state for the CORESET ID associated with each of the plurality of component carriers in response to the serving cell ID being within the TCI state update list and based on a respective single frequency network (SFN) configuration of each of the plurality of component carriers.

Aspect 2: The method of aspect 1, wherein the TCI state activation message is a medium access control (MAC) control element (MAC-CE).

Aspect 3: The method of aspect 1 or 2, wherein the activating the at least one of the first TCI state or the second TCI state comprises: activating both the first TCI state and the second TCI state for the CORESET ID associated with each of the plurality of component carriers.

Aspect 4: The method of aspect 3, wherein the first TCI state is associated with a first transmission and reception point (TRP) and the second TCI state is associated with a second TRP, the first TRP being a Doppler anchor TRP.

Aspect 5: The method of aspect 3 or 4, wherein the respective SFN configuration of each of the plurality of component carriers indicates that each of the plurality of component carriers supports an SFN operation for the CORESET ID.

Aspect 6: The method of aspect 5, wherein the TCI state update list is configured to prohibit inclusion of other component carriers that do not support the SFN operation for the CORESET ID.

Aspect 7: The method of aspect 3 or 4, wherein the respective SFN configuration of at least one component carrier of the plurality of component carriers indicates that the at least one component carrier supports an SFN operation for the CORESET ID.

Aspect 8: The method of aspect 1 or 2, wherein the activating the at least one of the first TCI state or the second TCI state comprises: activating only one of the first TCI state or the second TCI state for the CORESET ID associated with each of the plurality of component carriers in response to the respective SFN configuration of each of the plurality of component carriers indicating that not all of the plurality of component carriers support an SFN operation for the CORESET ID.

Aspect 9: The method of aspect 8, wherein the TCI state activation message further comprises a reserved field indicating activation of the first TCI state or the second TCI state for the plurality of component carriers.

Aspect 10: The method of aspect 1 or 2, wherein the activating the at least one of the first TCI state or the second TCI state comprises: activating both the first TCI state and the second TCI state for the CORESET ID associated with a first set of the plurality of component carriers for which the respective SFN configuration indicates that an SFN operation is supported for the CORESET ID; and activating only one of the first TCI state or the second TCI state for the CORESET ID associated with a second set of the plurality of component carriers for which the respective SFN configuration indicates that SFN operation is not supported for the CORESET ID.

Aspect 11: The method of aspect 10, wherein the TCI state activation message further comprises a reserved field indicating activation of the first TCI state or the second TCI state for the second set of the plurality of component carriers.

Aspect 12: The method of aspect 1 or 2, wherein the TCI state activation message further comprising a third TCI state for the CORESET ID.

Aspect 13: The method of aspect 12, wherein the activating the at least one of the first TCI state or the second TCI state comprises: activating both the second TCI state and the third TCI state for the CORESET ID associated with each of the plurality of component carriers in response to the SFN configuration of the serving cell indicating that the serving cell supports an SFN operation for the CORESET ID; or activating the first TCI state for the CORESET ID associated with each of the plurality of component carriers in response to the SFN configuration of the serving cell indicating that the serving cell does not support the SFN operation for the CORESET ID.

Aspect 14: The method of aspect 12, wherein the activating the at least one of the first TCI state or the second TCI state comprises: activating both the second TCI state and the third TCI state for the CORESET ID associated with a first set of the plurality of component carriers for which the respective SFN configuration indicates that an SFN operation is supported for the CORESET ID; and activating the first TCI state for the CORESET ID associated with a second set of the plurality of component carriers for which the respective SFN configuration indicates that SFN operation is not supported for the CORESET ID.

Aspect 15: The method of aspect 1 or 2, wherein the TCI state activation message further comprises a reserved field indicating activation of either the first TCI state or both the first TCI state and the second TCI state for each of the plurality of component carriers.

Aspect 16: A user equipment (UE) configured for wireless communication comprising a transceiver, a memory, and a processor coupled to the transceiver and the memory, the processor and the memory being configured to perform a method of any one of aspects 1-15.

Aspect 17: A UE configured for wireless communication comprising means for performing a method of any one of aspects 1-15.

Aspect 18: An article of manufacture comprising a non-transitory computer-readable medium having stored therein instructions executable by one or more processors of a UE to perform a method of any one of aspects 1-15.

Aspect 19: A method for wireless communication at a base station, the method comprising: transmitting a transmission configuration indicator (TCI) state update list comprising a plurality of component carriers to a user equipment (UE); and transmitting a TCI state activation message comprising a first TCI state, a second TCI state, a serving cell identifier (ID), and a control resource set (CORESET) ID to the UE, the TCI state activation message being configured to activate at least one of the first TCI state or the second TCI state on the UE for the CORESET ID associated with each of the plurality of component carriers based on the serving cell ID being within the TCI state update list and further based on a respective single frequency network (SFN) configuration of each of the plurality of component carriers.

Aspect 20: The method of aspect 19, wherein the TCI state activation message is a medium access control (MAC) control element (MAC-CE).

Aspect 21: The method of aspect 19 or 20, wherein the TCI state activation message is configured to activate both the first TCI state and the second TCI state on the UE for the CORESET ID associated with each of the plurality of component carriers.

Aspect 22: The method of aspect 21, wherein the first TCI state is associated with a first transmission and reception point (TRP) associated with the base station and the second TCI state is associated with a second TRP associated with the base station, the first TRP being a Doppler anchor TRP.

Aspect 23: The method of aspect 21 or 22, wherein the respective SFN configuration of each of the plurality of component carriers indicates that each of the plurality of component carriers supports an SFN operation for the CORESET ID.

Aspect 24: The method of aspect 23, further comprising: prohibiting the TCI state update list from including other component carriers that do not support the SFN operation for the CORESET ID.

Aspect 25: The method of aspect 19 or 20, wherein the TCI state activation message is configured to: activate both the first TCI state and the second TCI state on the UE for the CORESET ID associated with a first set of the plurality of component carriers for which the respective SFN configuration indicates that an SFN operation is supported for the CORESET ID; and activate only one of the first TCI state or the second TCI state on the UE for the CORESET ID associated with a second set of the plurality of component carriers for which the respective SFN configuration indicates that SFN operation is not supported for the CORESET ID.

Aspect 26: The method of aspect 25, wherein the TCI state activation message further comprises a reserved field indicating activation of the first TCI state or the second TCI state for the second set of the plurality of component carriers.

Aspect 27: The method of aspect 19 or 20, wherein the TCI state activation message further comprises a third TCI state for the CORESET ID, the TCI state activation message being configured to either: activate the second TCI state and the third TCI state on the UE for the CORESET ID associated with each of the plurality of component carriers in response to the SFN configuration of the serving cell indicating that the serving cell supports an SFN operation for the CORESET ID; or activate the first TCI state for the CORESET ID associated with each of the plurality of component carriers in response to the SFN configuration of the serving cell indicating that the serving cell does not support the SFN operation for the CORESET ID.

Aspect 28: The method of aspect 19 or 20, wherein the TCI state activation message further comprises a reserved field indicating activation of either the first TCI state or both the first TCI state and the second TCI state for each of the plurality of component carriers.

Aspect 29: A base station configured for wireless communication comprising a memory and a processor coupled to the memory, the processor and the memory being configured to perform a method of any one of aspects 19-28.

Aspect 30: A base station configured for wireless communication comprising means for performing a method of any one of aspects 19-28.

Aspect 31: An article of manufacture comprising a non-transitory computer-readable medium having stored therein instructions executable by one or more processors of a base station to perform a method of any one of aspects 19-28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 5, 6, 10, 12, 14, and/or 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) configured for wireless communication, comprising:
   one or more memories; and
   one or more processors coupled to the one or more memories, the one or more processors being configured to:
   receive a transmission configuration indicator (TCI) state update list comprising a plurality of component carriers;
   receive a TCI state activation message comprising a first TCI state, a second TCI state, a serving cell identifier (ID), a control resource set (CORESET) ID, and a reserved field; and
   activate only one of the first TCI state or the second TCI state for the CORESET ID associated with at least a first set of component carriers of the plurality of component carriers for which a respective single frequency network (SFN) configuration indicates that SFN operation is not supported for the CORESET ID in response to the serving cell ID being within the TCI state update list, wherein the reserved field indicates which of the first TCI state or the second TCI state is to be activated for the first set of component carriers.

2. The UE of claim 1, wherein the TCI state activation message is a medium access control (MAC) control element (MAC-CE).

3. The UE of claim 1, wherein the one or more processors are further configured to:
   activate both the first TCI state and the second TCI state for the CORESET ID associated with a second set of the plurality of component carriers for which the respective SFN configuration indicates that the SFN operation is supported for the CORESET ID.

4. The UE of claim 1, wherein the TCI state activation message further comprising a third TCI state for the CORESET ID.

5. The UE of claim 4, wherein the one or more processors are further configured to:
   activate at least two of the first TCI state, the second TCI state and the third TCI state for the CORESET ID associated with a second set of the plurality of component carriers for which the respective SFN configuration indicates that the SFN operation is supported for the CORESET ID.

6. A network entity configured for wireless communication, comprising:
   one or more memories; and one or more processors coupled to the one or more memories, the one or more processors being configured to:

provide a transmission configuration indicator (TCI) state update list comprising a plurality of component carriers to a user equipment (UE); and provide a TCI state activation message comprising a first TCI state, a second TCI state, a serving cell identifier (ID), a control resource set (CORESET) ID, and a reserved field, the TCI state activation message being configured to activate only one of the first TCI state or the second TCI state on the UE for the CORESET ID associated with at least a first set of component carriers of the plurality of component carriers for which a respective single frequency network (SFN) configuration indicates that SFN operation is not supported for the CORESET ID in response to the serving cell ID being within the TCI state update list, wherein the reserved field indicates which of the first TCI state or the second TCI state is to be activated for the first set of component carriers.

7. The network entity of claim 6, wherein the TCI state activation message is a medium access control (MAC) control element (MAC-CE).

8. The network entity of claim 6, wherein the TCI state activation message is configured to:

activate both the first TCI state and the second TCI state on the UE for the CORESET ID associated with a second set of the plurality of component carriers for which the respective SFN configuration indicates that the SFN operation is supported for the CORESET ID.

9. The network entity of claim 6, wherein the TCI state activation message further comprises a third TCI state for the CORESET ID, the TCI state activation message being configured to:

activate at least two of the first TCI state, the second TCI state and the third TCI state on the UE for the CORE-SET ID associated with a second set of the plurality of component carriers for which the respective SFN configuration indicates that the SFN operation is supported for the CORESET ID.

10. A method for wireless communication at a user equipment (UE), the method comprising:

receiving a transmission configuration indicator (TCI) state update list comprising a plurality of component carriers;

receiving a TCI state activation message comprising a first TCI state, a second TCI state, a serving cell identifier (ID), a control resource set (CORESET) ID, and a reserved field; and activating only one of the first TCI state or the second TCI state for the CORESET ID associated with at least a first set of component carriers of the plurality of component carriers for which a respective single frequency network (SFN) configuration indicates that SFN operation is not supported for the CORESET ID in response to the serving cell ID being within the TCI state update list, wherein the reserved field indicates which of the first TCI state or the second TCI state is to be activated for the first set of component carriers.

11. The method of claim 10, wherein the TCI state activation message is a medium access control (MAC) control element (MAC-CE).

12. The method of claim 10, wherein the TCI state activation message further comprises a third TCI state for the CORESET ID.

13. The method of claim 12, further comprising:

activating at least two of the first TCI state, the second TCI state and the third TCI state for the CORESET ID associated with a second set of the plurality of component carriers for which the respective SFN configuration indicates that the SFN operation is supported for the CORESET ID.

14. A method for wireless communication at a network entity, the method comprising:

providing a transmission configuration indicator (TCI) state update list comprising a plurality of component carriers to a user equipment (UE); and providing a TCI state activation message comprising a first TCI state, a second TCI state, a serving cell identifier (ID), a control resource set (CORESET) ID, and a reserved field to the UE, the TCI state activation message being configured to enable the UE to active only one of the first TCI state or the second TCI state for the CORESET ID associated with at least a first set of component carriers of the plurality of component carriers for which a respective single frequency network (SFN) configuration indicates that SFN operation is not supported for the CORESET ID in response to the serving cell ID being within the TCI state update list, wherein the reserved field indicates which of the first TCI state or the second TCI state is to be activated for the first set of component carriers.

15. The method of claim 13, wherein the TCI state activation message is configured to activate both the first TCI state and the second TCI state on the UE for the CORESET ID associated with a second set of the plurality of component carriers for which the respective SFN configuration indicates that the SFN operation is supported for the CORESET ID.

16. The method of claim 13, wherein the TCI state activation message further comprises a third TCI state for the CORESET ID.

17. The method of claim 16, wherein the TCI state activation message is configured to activate at least two of the first TCI state, the second TCI state and the third TCI state on the UE for the CORESET ID associated with a second set of the plurality of component carriers for which the respective SFN configuration indicates that the SFN operation is supported for the CORESET ID.

18. The method of claim 14, wherein the TCI state activation message is a medium access control (MAC) control element (MAC-CE).

* * * * *